(12) United States Patent
Shimokawa et al.

(10) Patent No.: US 11,456,632 B2
(45) Date of Patent: Sep. 27, 2022

(54) CONSEQUENT-POLE TYPE ROTOR, ELECTRIC MOTOR, AIR CONDITIONER, AND METHOD FOR MANUFACTURING CONSEQUENT-POLE TYPE ROTOR

(71) Applicant: Mitsubishi Electric Corporation, Tokyo (JP)

(72) Inventors: Takaya Shimokawa, Tokyo (JP); Koji Yabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/095,730

(22) PCT Filed: Jul. 15, 2016

(86) PCT No.: PCT/JP2016/071009
§ 371 (c)(1),
(2) Date: Oct. 23, 2018

(87) PCT Pub. No.: WO2018/011979
PCT Pub. Date: Jan. 18, 2018

(65) Prior Publication Data
US 2019/0173337 A1 Jun. 6, 2019

(51) Int. Cl.
*H02K 1/27* (2006.01)
*H02K 1/276* (2022.01)
*H02K 15/03* (2006.01)
*H02K 15/12* (2006.01)
*H02K 1/278* (2022.01)
(Continued)

(52) U.S. Cl.
CPC ............. *H02K 1/276* (2013.01); *H02K 1/27* (2013.01); *H02K 1/278* (2013.01); *H02K 1/2746* (2013.01); *H02K 1/28* (2013.01); *H02K 15/03* (2013.01); *H02K 15/12* (2013.01)

(58) Field of Classification Search
CPC .......... H02K 15/03; H02K 1/276; H02K 1/28; H02K 15/12; H02K 1/27; H02K 1/2746; H02K 1/278; H02K 21/14; H02K 7/003; F24F 1/0018; F24F 1/38
See application file for complete search history.

(56) References Cited

U.S. PATENT DOCUMENTS

2006/0273679 A1 12/2006 Iwase et al.
2011/0181230 A1* 7/2011 Yamada ............... H02K 1/2746
    318/724
2011/0273037 A1 11/2011 Ota et al.
(Continued)

FOREIGN PATENT DOCUMENTS

CN    1848614 A    10/2006
CN    102244449 A    11/2011
(Continued)

OTHER PUBLICATIONS

Machine translation of JP-2012244783-A (Year: 2012).*
(Continued)

*Primary Examiner* — Bernard Rojas
(74) *Attorney, Agent, or Firm* — Posz Law Group, PLC

(57) ABSTRACT

A rotor includes a rotor core, a permanent magnet, a first part, a second part, and a third part. The third part is formed integrally with the first part and the second part. The rotor core is longer than the permanent magnet in an axial direction.

19 Claims, 16 Drawing Sheets

(51) Int. Cl.
*H02K 1/2746* (2022.01)
*H02K 1/28* (2006.01)

(56) References Cited

U.S. PATENT DOCUMENTS

| | | | | |
|---|---|---|---|---|
| 2013/0055771 | A1* | 3/2013 | Tashiro | D06F 37/304 |
| | | | | 68/140 |
| 2013/0334907 | A1* | 12/2013 | Ikuta | H02K 1/2706 |
| | | | | 310/45 |
| 2014/0001909 | A1* | 1/2014 | Taniguchi | H02K 1/274 |
| | | | | 310/156.15 |
| 2015/0061443 | A1* | 3/2015 | Tanaka | H02K 1/276 |
| | | | | 310/156.08 |
| 2015/0171678 | A1 | 6/2015 | Tsutsui et al. | |
| 2018/0123411 | A1* | 5/2018 | Kawaguchi | H02K 1/28 |
| 2019/0386530 | A1* | 12/2019 | Takahashi | H02K 1/27 |
| 2020/0251944 | A1* | 8/2020 | Watanabe | H02K 7/14 |

FOREIGN PATENT DOCUMENTS

| | | | |
|---|---|---|---|
| JP | 2001-157394 A | 6/2001 | |
| JP | 2007-205246 A | 8/2007 | |
| JP | 2007-209178 A | 8/2007 | |
| JP | 2012-044809 A | 3/2012 | |
| JP | 2012-085445 A | 4/2012 | |
| JP | 5684529 B2 | 4/2012 | |
| JP | 5755896 B2 | 8/2012 | |
| JP | 2012-170190 A | 9/2012 | |
| JP | 5731251 B2 | 10/2012 | |
| JP | 2012-244783 A | 12/2012 | |
| JP | 2012244783 A * | 12/2012 | |
| JP | 2015-204734 A | 11/2015 | |
| JP | 5920472 B2 | 4/2016 | |
| WO | WO-2017221341 A1 * | 12/2017 | H02K 1/276 |

OTHER PUBLICATIONS

Office Action dated Jan. 3, 2020 issued in corresponding CN patent application No. 201680087248.3 (and English translation).
Office Action dated Dec. 3, 2019 issued in corresponding JP patent application No. 2018-527358 (and English translation).
Office Action dated May 21, 2019 issued in corresponding JP patent application No. 2018-527358 (and English translation).
International Search Report of the International Searching Authority dated Oct. 11, 2016 for the corresponding international application No. PCT/JP2016/071009 (and English translation).
Japanese Office Action dated Mar. 31, 2020 issued in corresponding JP patent application No. 2018-527358 (and English translation).
Office Action dated Oct. 10, 2019 issued in corresponding KR patent application No. 10-2018-7033240 (and English translation).
Office Action (Decision of Refusal) dated Sep. 8, 2020 issued in corresponding JP patent application No. 2018-527358 (and English translation).
Office Action (Decision of Dismissal of Amendment) dated Sep. 8, 2020 issued in corresponding JP patent application No. 2018-527358 ( and English translation).
Office Action dated Oct. 10, 2020 issued in corresponding CN patent application No. 201680087248.3 ( and English translation).
Chinese Office Action dated Apr. 16, 2021, issued in corresponding Chinese Patent Application No. 201680087248.3 (and English Machine Translation).
Office Action dated Jun. 29, 2021 issued in corresponding JP patent application No. 2018-527358 (and English machine translation).
Office Action dated Aug. 11, 2021, issued in corresponding CN Patent Application No. 201680087248.3 (and English Machine Translation).
Office Action dated Nov. 3, 2021 issued in corresponding CN patent application No. 201680087248.3 (and English machine translation).

* cited by examiner

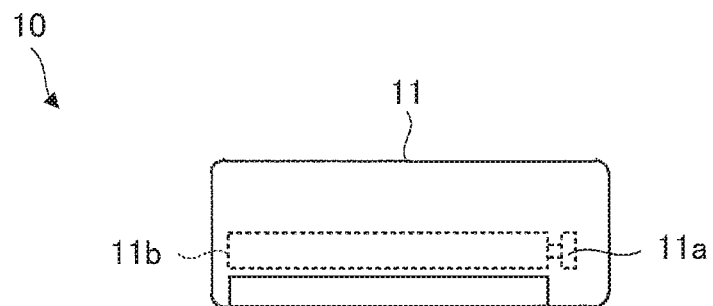
FIG. 16
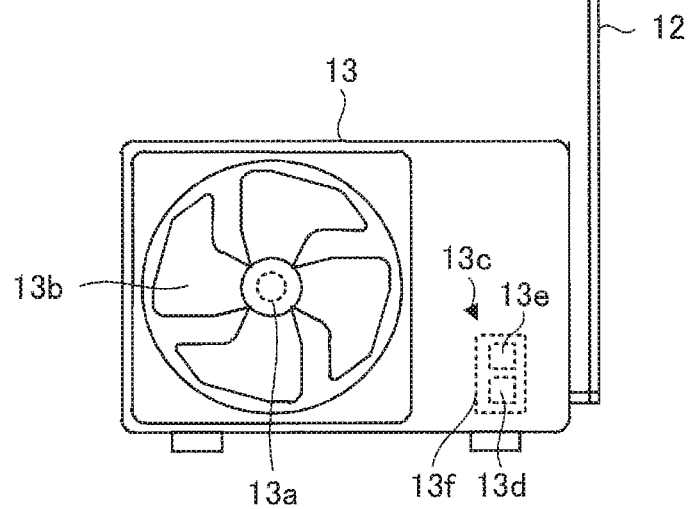
FIG. 17
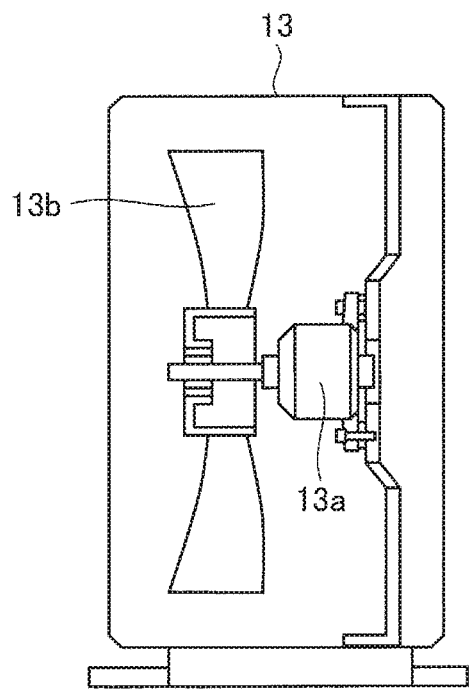

CONSEQUENT-POLE TYPE ROTOR, ELECTRIC MOTOR, AIR CONDITIONER, AND METHOD FOR MANUFACTURING CONSEQUENT-POLE TYPE ROTOR

CROSS REFERENCE TO RELATED APPLICATION

This application is a U.S. national stage application of International Patent Application No. PCT/JP2016/071009 filed on Jul. 15, 2016, the disclosure of which is incorporated herein by reference.

TECHNICAL FIELD

The present invention relates to an electric motor including a rotor.

BACKGROUND ART

A consequent-pole type rotor has been used as a rotor of an electric motor. In the consequent-pole type rotor, a region between permanent magnets adjacent to each other in a circumferential direction (e.g., a magnetic pole functioning as the north pole to a stator) functions as the other magnetic pole (e.g., a pseudo-magnetic pole functioning as the south pole to the stator). As compared to a general rotor having no pseudo-magnetic pole, the number of permanent magnets can be halved in the consequent-pole type rotor, and thus, costs for the rotor can be reduced. In the consequent-pole type rotor, however, magnetic flux from a permanent magnet easily flows into a rotor shaft. In view of this, proposed is a rotor in which a covered fixing member composed of a non-magnetic material is attached between the shaft and a permanent magnet (see, for example, Patent Reference 1).

PATENT REFERENCE

Patent reference 1: Japanese Patent Application Publication No. 2012-85445

The covered fixing member disclosed in Patent Reference 1 is assembled by combining a plurality of previously formed components. Thus, a load is easily applied to a joining part between the components, and damage or a position shift easily occur in the joining part, disadvantageously.

SUMMARY

It is therefore an object of the present invention to enhance strength of a consequent-pole type rotor.

A consequent-pole type rotor used for an electric motor including a stator according to the present invention includes: a rotor core including a first end part and a second end part in an axial direction, and a hole; a permanent magnet inserted in the hole; a first part formed inside the rotor core in a radial direction; a second part that is adjacent to the permanent magnet in the hole; and a third part formed on the first end part, the third part being formed integrally with the first part and the second part, wherein the rotor core is longer than the permanent magnet in the axial direction, and a length of the first part in the radial direction is three times or more as large as a length of an air gap formed between the stator and the rotor core.

According to the present invention, strength of a consequent-pole type rotor can be enhanced.

BRIEF DESCRIPTION OF THE DRAWINGS

FIG. 16 is a diagram schematically illustrating a configuration of an air conditioner according to a second embodiment of the present invention.

FIG. 17 is a diagram schematically illustrating main components in an outdoor unit of the air conditioner.

DETAILED DESCRIPTION

First Embodiment

Figure 1:
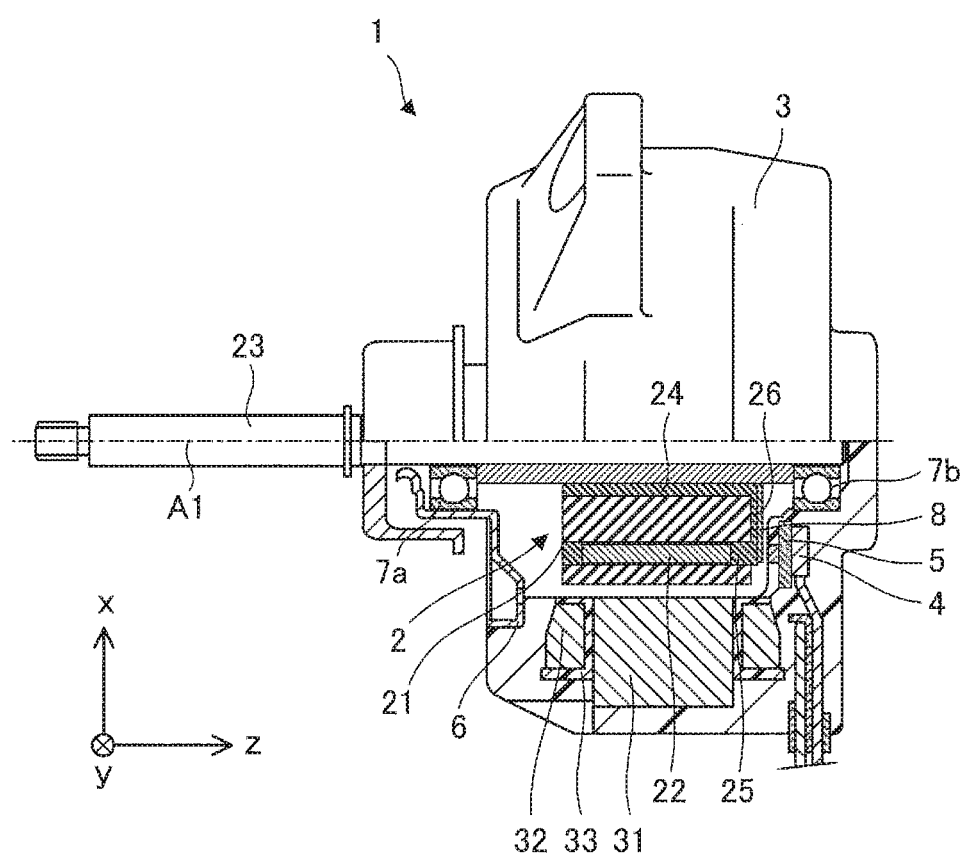
FIG. 1 is a partial cross-sectional view schematically illustrating a structure of an electric motor according to a first embodiment of the present invention.

An electric motor 1 according to a first embodiment of the present invention will be described.

In an xyz orthogonal coordinate system illustrated in the drawings, a z axis direction (z axis) represents a direction parallel to an axis line A1 (shaft center) of a shaft 23 of the electric motor 1 (hereinafter referred to as an "axial direction"), an x axis direction (x axis) represents a direction orthogonal to the z axis direction (z axis), and a y axis direction represents a direction orthogonal to both of the z axis direction and the x axis direction.

FIG. 1 is a partial cross-sectional view schematically illustrating a configuration of the electric motor 1 according to the first embodiment of the present invention.

The electric motor 1 includes a rotor 2, a stator 3, a circuit board 4, a magnetic sensor 5 for detecting a rotation position of the rotor 2, a bracket 6, bearings 7a and 7b, and a sensor magnet 8. The electric motor 1 is, for example, a permanent magnet synchronous motor. The electric motor 1 does not need to include the circuit board 4, the magnetic sensor 5, and the sensor magnet 8.

The circuit board 4 is disposed at an end of the stator 3 in the axial direction. Electronic components such as a control circuit and the magnetic sensor 5 are mounted on the circuit board 4. The magnetic sensor 5 detects a rotation position of the sensor magnet 8, thereby detecting a rotation position of the rotor 2. The sensor magnet 8 is attached to the rotor 2 to face the magnetic sensor 5. The sensor magnet 8 has a disc shape.

The rotor 2 includes a rotor core 21, at least one permanent magnet 22, the shaft 23, a first resin part 24 as a first part, a second resin part 25 as a second part, and a third resin part 26 as a third part. A rotation axis of the rotor 2 coincides with the axis line A1. The rotor 2 is, for example, of a permanent magnet-embedded type. In this embodiment, the rotor 2 is a consequent-pole type rotor. In this embodiment, the first part, the second part, and the third part are resin bodies made of a resin material (including plastics), but may be structures made of a material except the resin material (a material containing a non-magnetic material as a main component).

In the consequent-pole type rotor 2 used in this embodiment, a region between permanent magnets 22 adjacent to each other in the circumferential direction (e.g., magnetic poles functioning as the north poles to the stator 3) spuriously form the other magnetic pole (e.g., a pseudo-magnetic pole functioning as the south pole to the stator 3).

The stator 3 includes a stator core 31, a coil 32, and an insulator 33. The stator 3 has a ring shape, and has a rotor insertion hole in which the rotor 2 is inserted.

The stator core 31 is formed by, for example, stacking a plurality of electromagnetic steel sheets. Each of the electromagnetic steel sheets has a thickness of 0.2 mm to 0.5 mm, for example. The stator core 31 has a ring shape. The coil 32 is formed by, for example, winding a lead wire (e.g., a magnet wire) around teeth of the stator core 31 with the insulator 33 interposed therebetween. The coil 32 is insulated by the insulator 33.

The insulator 33 may be made of an insulating resin such as polybutylene terephthalate (PBT), polyphenylene sulfide (PPS), liquid crystal polymer (LCP), or polyethylene terephthalate (PET) or paper.

In this embodiment, the stator core 31, the coil 32, and the insulator 33 are covered with a thermoplastic resin (molding resin) such as an unsaturated polyester resin. The stator core 31, the coil 32, and the insulator 33 may be fixed by a cylindrical shell. In this case, the cylindrical shell contains iron as main component and can cover the stator 3 together with the rotor 2 by shrink fitting.

The rotor 2 is disposed inside the stator 3 with an air gap interposed therebetween. The bracket 6 is press fitted in an opening at a load side (load side of the electric motor 1) of the stator 3. The shaft 23 is inserted in the bearing 7a, and the bearing 7a is fixed at the load side of the stator 3. Similarly, the shaft 23 is inserted in the bearing 7b, and the bearing 7b is fixed at a counter-load side of the stator 3. The rotor 2 is rotatably supported by the bearings 7a and 7b.

The shaft 23 is formed inside the first resin part 24 in the radial direction of the rotor 2 (rotor core 21) (hereinafter simply referred to as a "radial direction").

A structure of the rotor core 21 will be described.

Figure 2A:
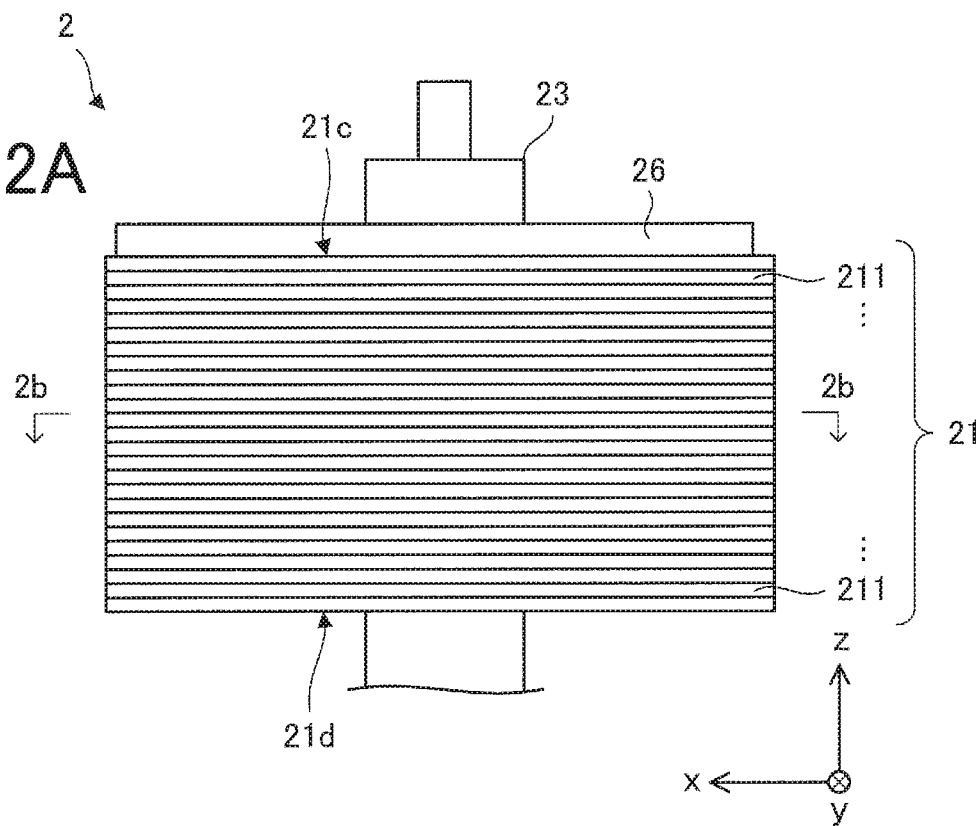
FIG. 2A is a front view schematically illustrating a structure of a rotor.
Figure 2B:
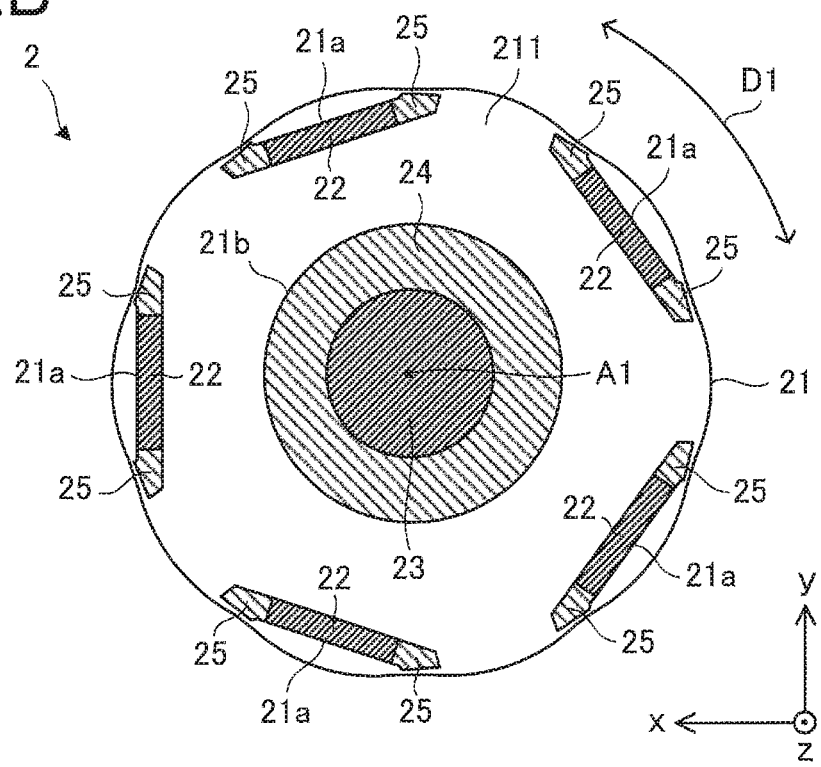
FIG. 2B is a cross-sectional view of the rotor taken along line 2b-2b in FIG. 2A.

FIG. 2A is a front view schematically illustrating a structure of the rotor 2. FIG. 2B is a cross-sectional view of the rotor 2 taken along line 2b-2b in FIG. 2A. FIGS. 2A and 2B do not show the sensor magnet 8 illustrated in FIG. 1 (the same holds for the subsequent drawings). Arrow D1 represents a circumferential direction of the rotor core 21 and the rotor 2 (hereinafter simply referred to as a "circumferential direction"). That is, arrow D1 represents a direction along the outer circumferences of the rotor core 21 and the rotor 2.

Figure 3A:
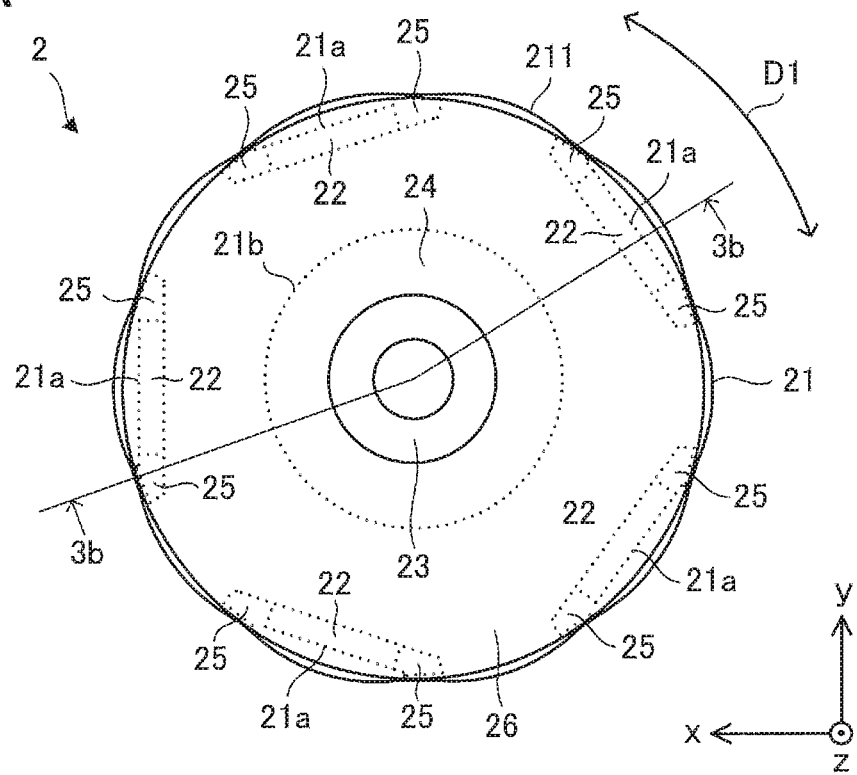
FIG. 3A is a plan view schematically illustrating the structure of the rotor.
Figure 3B:
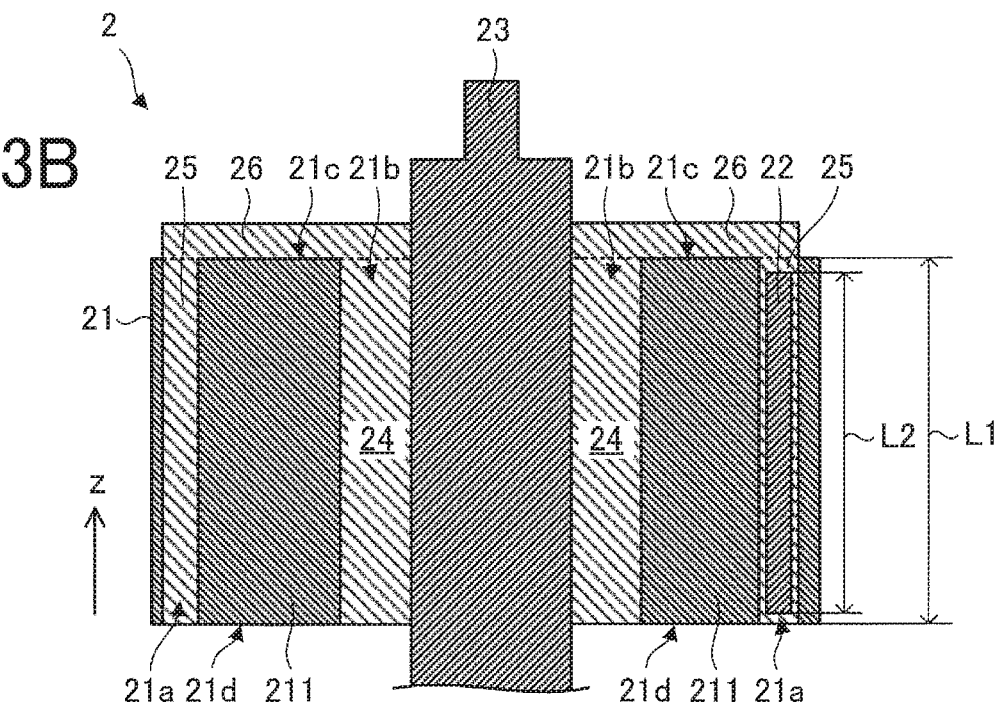
FIG. 3B is a cross-sectional view of the rotor taken along line 3b-3b in FIG. 3A.

FIG. 3A is a plan view schematically illustrating the structure of the rotor 2. FIG. 3B is a cross-sectional view of the rotor 2 taken along line 3b-3b in FIG. 3A.

The rotor core 21 includes at least one magnet insertion hole 21a (hereinafter also simply referred to as a "hole"), a through hole 21b in which the shaft 23 is inserted, and a first end part 21c and a second end part 21d in the axial direction. In this embodiment, the rotor core 21 (specifically, the electromagnetic steel sheets 211) has a plurality of magnet insertion holes 21a, and at least one permanent magnet 22 is inserted in each of the magnet insertion holes 21a.

As illustrated in FIG. 2A, the rotor core 21 is composed of the plurality of electromagnetic steel sheets 211. Each of the electromagnetic steel sheets 211 has a thickness of 0.2 mm to 0.5 mm, for example. Each of the electromagnetic steel sheets 211 is made of a soft magnetic material containing iron as main component, for example. The electromagnetic steel sheets 211 are stacked in the axial direction of the rotor 2. In this embodiment, each of the electromagnetic steel sheets 211 has the same structure. The plurality of electromagnetic steel sheets 211 may include an electromagnetic steel sheet having a different structure.

As illustrated in FIG. 2A, in this embodiment, the surfaces of the electromagnetic steel sheets 211 disposed at both ends of the rotor core 21 in the axial direction constitute the first end part 21c and the second end part 21d of the rotor core 21.

The outer edge (an outer edge on the xy plane) of the rotor core 21 may not be a complete circle. For example, in the example illustrated in FIG. 2B, the rotor core 21 is formed such that the length of the rotor core 21 in the radial direction is at maximum in a magnetic pole portion (a portion where the permanent magnet 22 is disposed and a portion constituting a pseudo-magnetic pole). In addition, in the example illustrated in FIG. 2B, the length of the rotor core 21 in the radial direction is at minimum between poles (a portion facing the second resin part 25). Accordingly, the magnetic pole portion has a curved shape, and thus, an induced voltage during rotation of the rotor 2 can be made in the form of a sine wave.

As illustrated in FIG. 2B, the plurality of magnet insertion holes 21a are formed in the circumferential direction of the rotor core 21 (specifically, the electromagnetic steel sheets 211). In this embodiment, five magnet insertion holes 21a are formed in the rotor core 21. The magnet insertion holes 21a penetrate the rotor core 21 in the axial direction. The through hole 21b (i.e., the through hole 21b of the rotor core 21) is formed in a center portion of the electromagnetic steel sheets 211. The through hole 21b penetrates the rotor core 21 in the axial direction. The shaft 23 is inserted in the through hole 21b.

The permanent magnet 22 is inserted in each magnet insertion hole 21a. In this embodiment, the permanent magnet 22 disposed in one magnet insertion hole 21a constitutes one magnetic pole of the rotor 2. The permanent magnets 22 are rare earth magnets containing neodymium, iron, and boron as main components. The type of the permanent magnets 22 is not limited to the example in this embodiment, and the permanent magnets 22 may be made of other materials. For example, the permanent magnets 22 may be rare earth magnets containing samarium, iron, and nitrogen as main components, or may be ferrite magnets. The plurality of permanent magnets 22 may be different magnets. Each of the permanent magnets 22 has a plurality of outer surfaces. In this embodiment, each of the permanent magnets 22 has a rectangular solid having six outer surfaces. The shape of the permanent magnet 22 is not limited to the example described in this embodiment.

A distance from the inner circumferential surface of the rotor core 21 forming the through hole 21b to the outer circumferential surface of the shaft 23 is preferably within a distance range where residual density of the permanent magnet 22 at the outer circumferential surface of the shaft 23 reaches ⅓. Accordingly, magnetic force of the rotor 2 can be maintained, and magnetic insulation between the outer circumferential surface of the shaft 23 and the inner peripheral surface of the rotor core 21 can be easily obtained.

As illustrated in FIG. 2B, the first resin part 24 is formed inside the rotor core 21 in the radial direction. Specifically, the first resin part 24 is formed around the shaft 23 in the through hole 21b. In other words, the first resin part 24 is disposed between the inner wall of the through hole 21b and the shaft 23.

The second resin part 25 is formed in each magnet insertion hole 21a. As illustrated in FIG. 2B, the second resin part 25 is adjacent to each side of the permanent magnet 22 in the circumferential direction. In other words, the second resin part 25 is disposed in each magnet insertion hole 21a so as to fill a gap caused by insertion of the permanent magnet 22 into the magnet insertion hole 21a. As illustrated in FIG. 3B, the second resin part 25 is preferably adjacent to the permanent magnet 22 in such a manner that the second resin part 25 contacts at least one of the plurality of outer surfaces of the permanent magnet 22. The second resin part 25 may be adjacent to the permanent magnet 22 so as to touch all outer surfaces of the plurality of outer surfaces of the permanent magnet 22.

The third resin part 26 is formed on the first end part 21c of the rotor core 21. A broken line in FIG. 3B represents a boundary between a region where the third resin part 26 is formed and a region where the first resin part 24 and the second resin part 25 are formed. The first resin part 24, the second resin part 25, and the third resin part 26 are made of the same resin material integrally. That is, the first resin part 24, the second resin part 25, and the third resin part 26 are a single structure (resin body) molded by integral molding. Thus, in this embodiment, the first resin part 24, the second resin part 25, and the third resin part 26 are not separated from one another in structure.

The first resin part 24, the second resin part 25, and the third resin part 26 are a resin containing a non-magnetic material (non-magnetic resin) as a main component. The first resin part 24, the second resin part 25, and the third resin part 26 are, for example, a thermoplastic resin such as a polybutylene terephthalate (PBT) resin or a polyphenylene sulfide (PPS) resin. The first resin part 24, the second resin part 25, and the third resin part 26 may include a glass filler. The first resin part 24, the second resin part 25, and the third resin part 26 may also be a thermosetting resin composed of a bulk molding compound (BMC), for example.

The length of the first resin part 24 in the radial direction is preferably three times or more as large as the length (length in the radial direction) of an air gap formed between the stator 3 and the rotor 2. In particular, the length of the first resin part 24 in the radial direction is preferably three times or more as large as the length of an air gap at a position adjacent to an inter-pole part (i.e., an air gap longest in the radial direction among air gaps formed along the circumferential direction). Accordingly, it is possible to reduce a flow of magnetic flux from the permanent magnets 22 into the shaft 23 (occurrence of leakage flux).

As illustrated in FIG. 3B, the rotor core 21 is longer than the permanent magnet 22 in the axial direction. Specifically, a length L1 of the rotor core 21 in the axial direction is longer than a length L2 of the permanent magnet 22 in the axial direction. In other words, the length of the magnet insertion hole 21a is longer than the length L2 of the permanent magnet 22 in the axial direction. Accordingly, ends of the permanent magnets 22 in the axial direction can be covered with the second resin part 25. In this embodiment, the length L1 is equal to the length from the first end part 21c to the second end part 21d of the rotor core 21.

First Variation

Figure 4A:
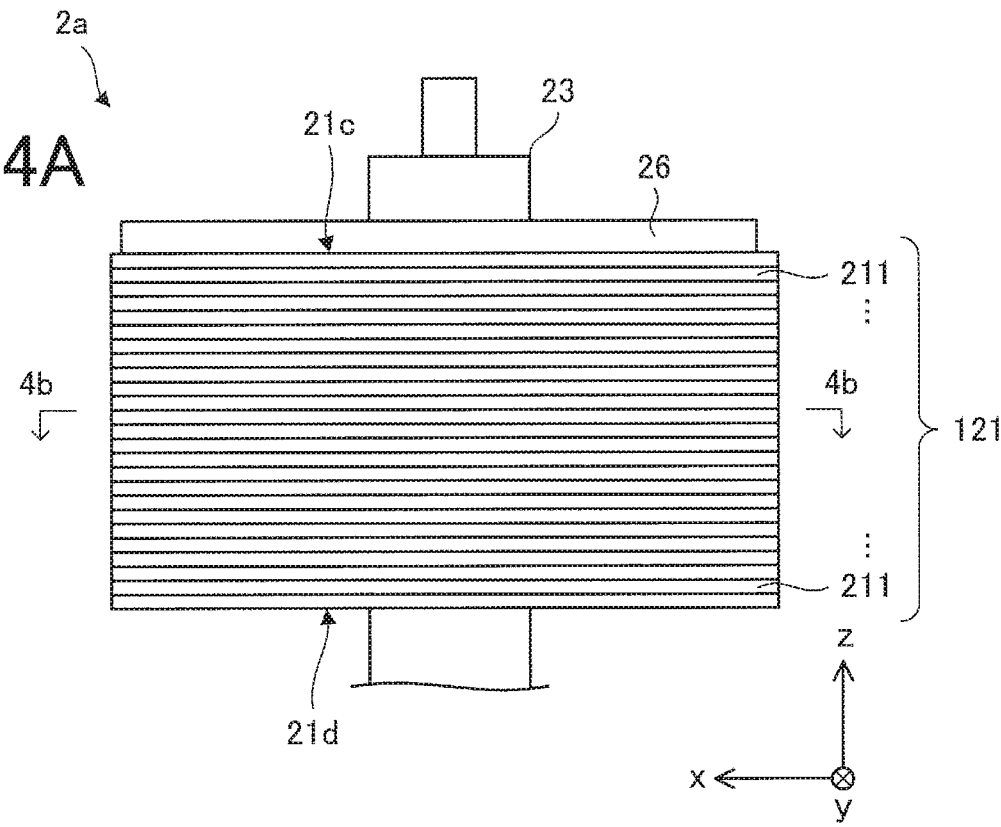
FIG. 4A is a front view schematically illustrating a structure of a rotor of an electric motor according to a first variation.
Figure 4B:
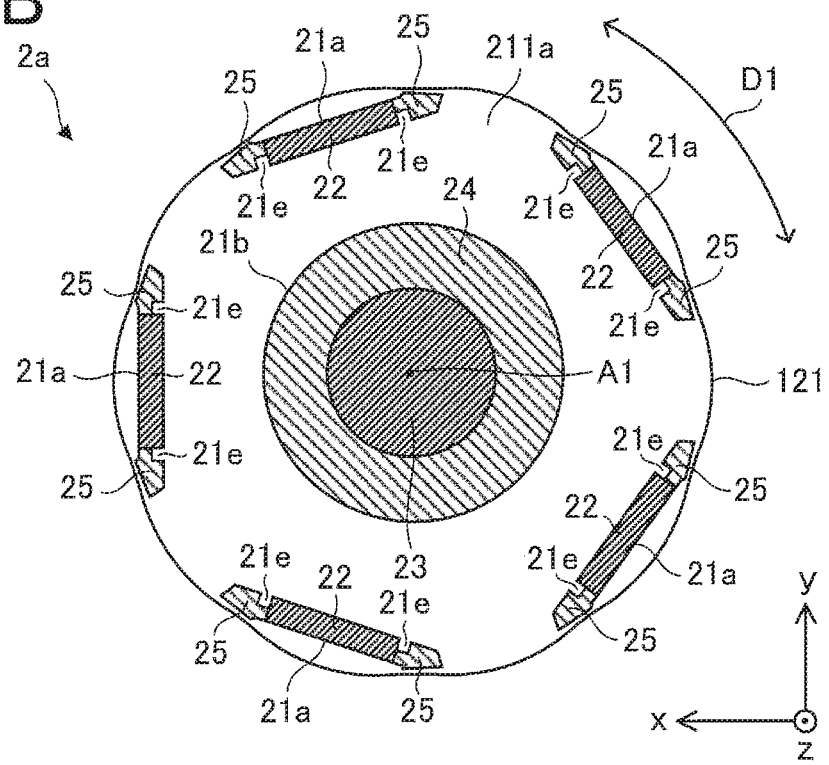
FIG. 4B is a cross-sectional view of the rotor taken along line 4b-4b in FIG. 4A.

FIG. 4 is a front view schematically illustrating a structure of a rotor 2a of an electric motor according to a first variation. FIG. 4B is a cross-sectional view of the rotor 2a taken along line 4b-4b in FIG. 4A.

Figure 5A:
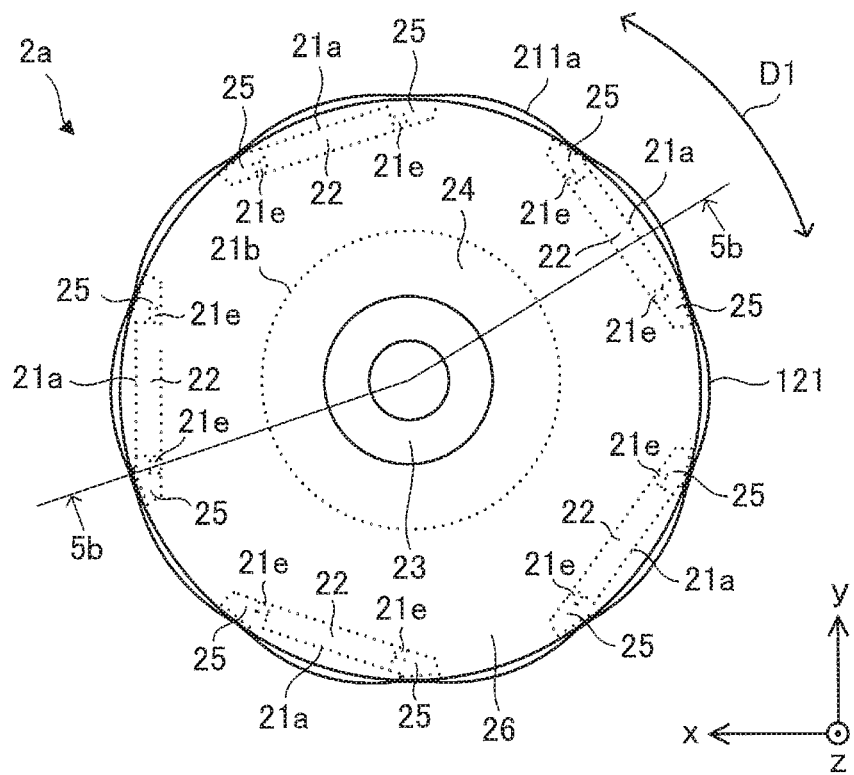
FIG. 5A is a plan view schematically illustrating the structure of the rotor.
Figure 5B:
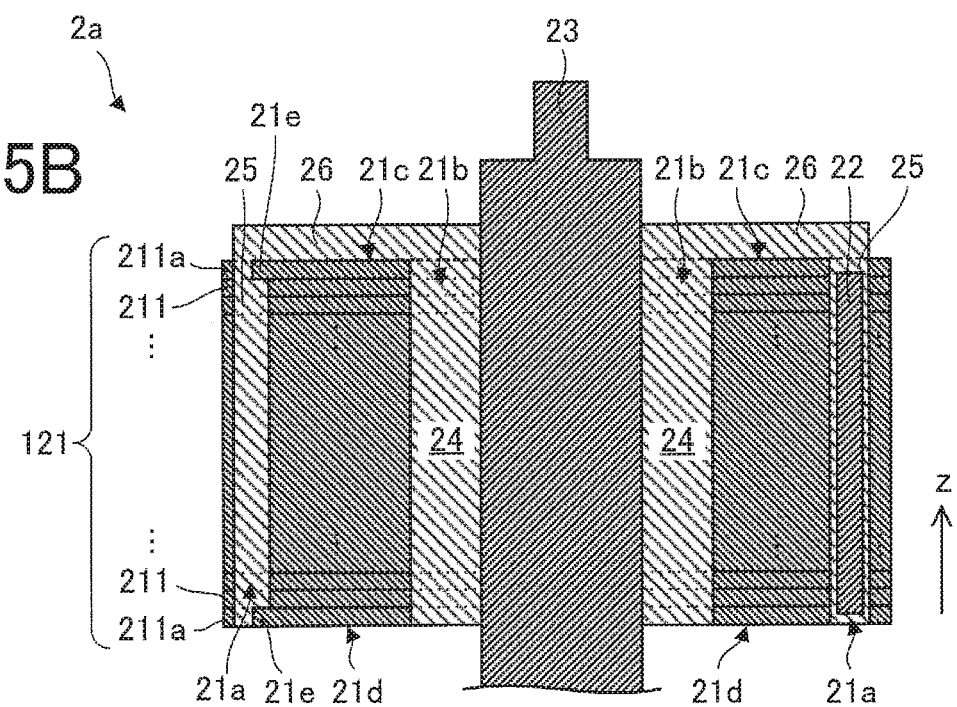
FIG. 5B is a cross-sectional view of the rotor taken along line 5b-5b in FIG. 5A.

FIG. 5A is a plan view schematically illustrating the structure of the rotor 2a. FIG. 5B is a cross-sectional view of the rotor 2a taken along line 5b-5b in FIG. 5A.

A rotor core 121 (specifically, at least one electromagnetic steel sheet 211a) of the rotor 2a of the electric motor according to the first variation has a projection 21e serving as at least one magnet fixing part for fixing the permanent magnet 22. That is, the rotor core 121 includes at least one electromagnetic steel sheet 211a having at least one projection 21e (FIG. 5B). In this respect, the rotor 2a is different from the rotor 2 of the electric motor 1 according to the first embodiment, and is the same as the rotor 2 in the other respects. The rotor 2a is applicable to the electric motor 1 according to the first embodiment, instead of the rotor 2.

The projection 21e is formed to project toward the inside of the magnet insertion hole 21a. In the first variation, two projections 21e are provided for one magnet insertion hole 21a. Each projection 21e is formed on each of both sides of the permanent magnet 22 so as to project outward in a radial direction of the rotor 2a (rotor core 121) (hereinafter simply referred to as a "radial direction").

One projection 21e may be formed for one magnet insertion hole 21a. In this case, the projection 21e is formed on an upstream side in the rotation direction of the rotor 2a so that displacement of the permanent magnet 22 during rotation of the rotor 2a can be effectively prevented.

As illustrated in FIG. 5B, at least one projection 22e is formed on at least one electromagnetic steel sheet 211a of the plurality of electromagnetic steel sheets. In the first variation, the electromagnetic steel sheet 211a having the projection 21e is stacked on each of both ends of the rotor core 121 in the axial direction. However, the position in the axial direction on which the electromagnetic steel sheet 211a having the projection 21e is stacked is not limited.

Second Variation

Figure 6A:
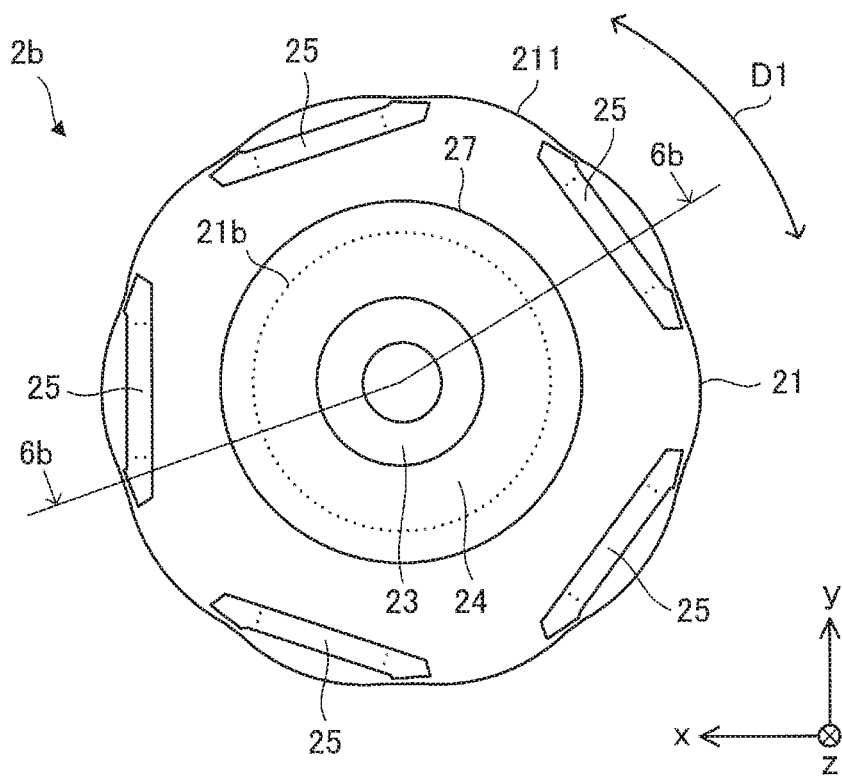
FIG. 6A is a bottom view schematically illustrating a structure of a rotor of an electric motor according to a second variation.
Figure 6B:
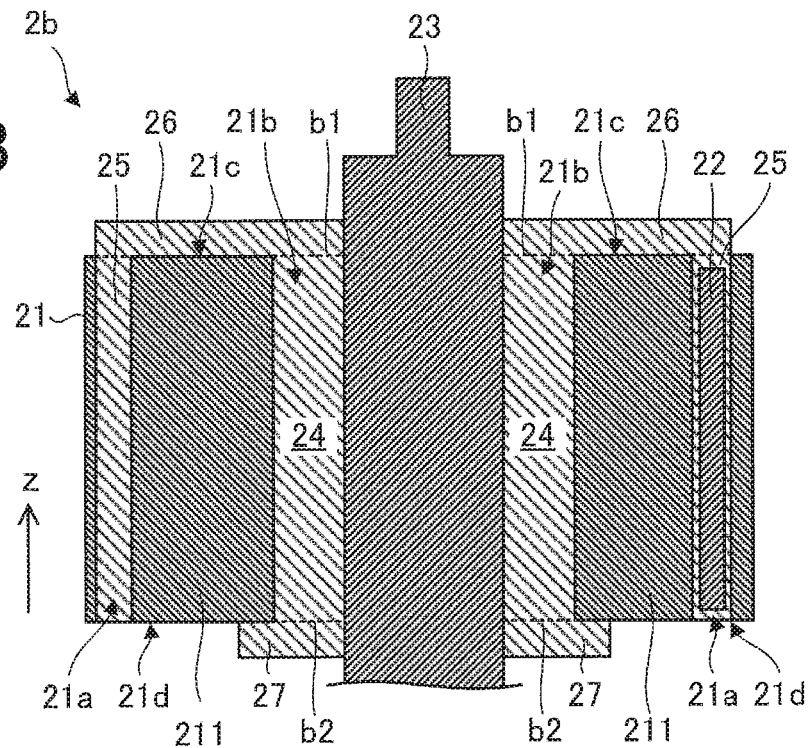
FIG. 6B is a cross-sectional view of the rotor taken along line 6b-6b in FIG. 6A.

FIG. 6A is a bottom view schematically illustrating a structure of a rotor 2b of an electric motor according to a second variation. FIG. 6B is a cross-sectional view of the rotor 2b taken along line 6b-6b in FIG. 6A.

The rotor 2b of the electric motor according to the second variation includes a fourth resin part 27 as a fourth part. In this respect, the rotor 2b is different from the rotor 2 of the electric motor 1 according to the first embodiment, and is the same as the rotor 2 in the other respects. The rotor 2b is applicable to the electric motor 1 according to the first embodiment, instead of the rotor 2. In the second variation, the first part, the second part, the third part, and the fourth part are resin bodies made of a resin material (including plastics), but may be structures made of a material except the resin material (a material containing non-magnetic material as a main component).

The broken line b1 in FIG. 6B represents a boundary between a region where the third resin part 26 is formed and a region where the first resin part 24 and the second resin part 25 are formed. The broken line b2 in FIG. 6B represents a boundary between a region where the fourth resin part 27 is formed and a region where the first resin part 24 is formed.

The rotor 2b has the fourth resin part 27 formed on the second end part 21d of the rotor core 21. The fourth resin part 27 is a resin containing a non-magnetic material (non-magnetic resin) as a main component. The rotor core 21 is sandwiched between the third resin part 26 and the fourth resin part 27 in the axial direction. The fourth resin part 27 is formed integrally with the first resin part 24. Thus, the first resin part 24, the second resin part 25, the third resin part 26, and the fourth resin part 27 are integrally made of the same resin material. That is, the first resin part 24, the second resin part 25, the third resin part 26, and the fourth resin part 27 are a single structure (resin body) molded by integral molding. Accordingly, in the second variation, the first resin part 24, the second resin part 25, the third resin part 26, and the fourth resin part 27 are not separated from one another in structure.

Third Variation

Figure 7A:
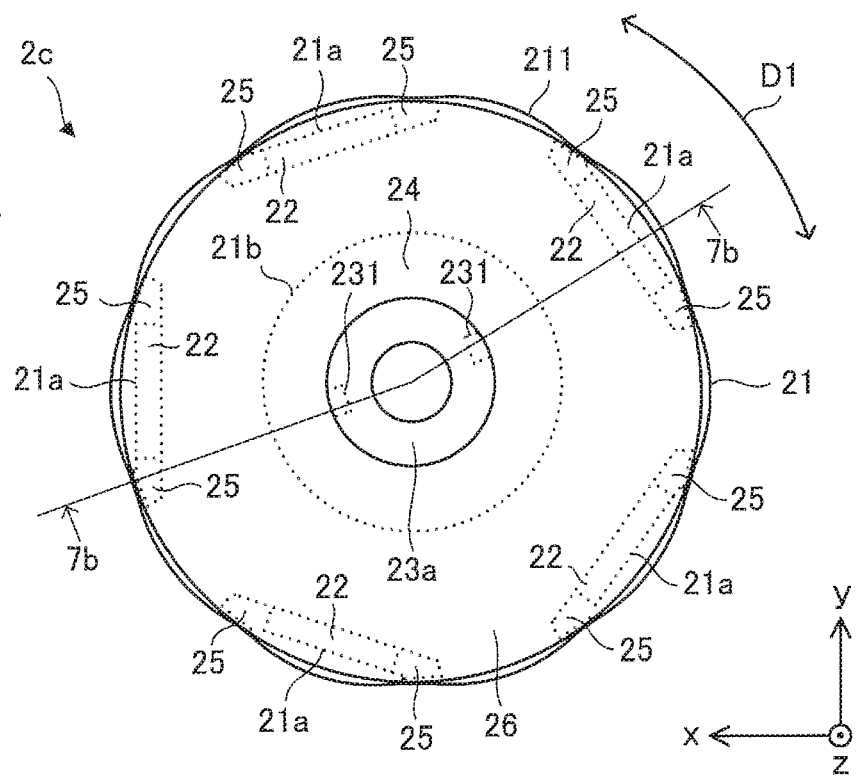
FIG. 7A is a plan view schematically illustrating a structure of a rotor of an electric motor according to a third variation.
Figure 7B:
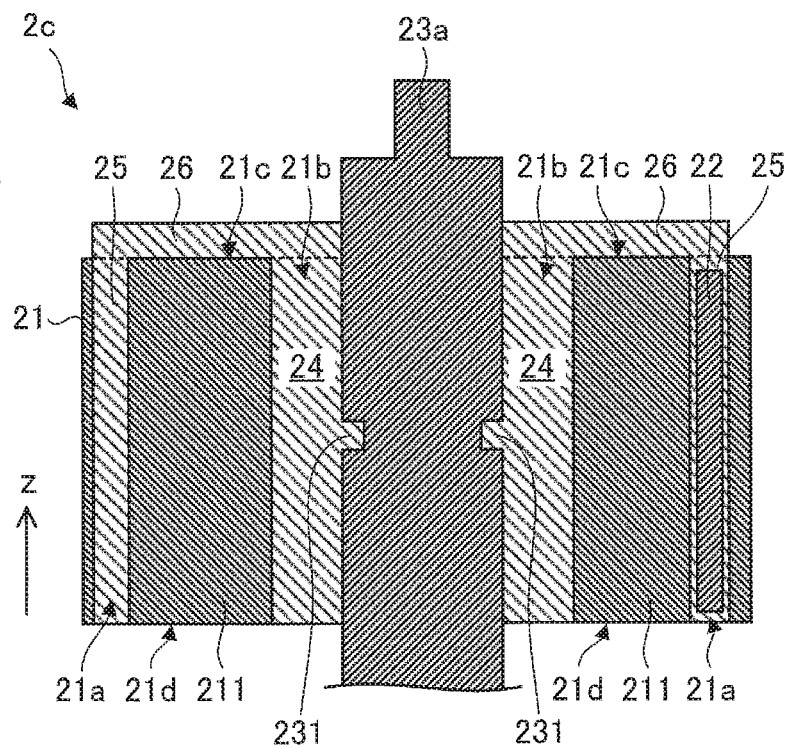
FIG. 7B is a cross-sectional view of the rotor taken along line 7b-7b in FIG. 7A.

FIG. 7A is a plan view schematically illustrating a structure of a rotor 2c of an electric motor according to a third variation. FIG. 7B is a cross-sectional view of the rotor 2c taken long line 7b-7b in FIG. 7A.

The rotor 2c of the electric motor according to the third variation includes a shaft 23a. The rotor 2c is different from the rotor 2 of the electric motor 1 according to the first embodiment in including the shaft 23a instead of the shaft 23, and is the same as the rotor 2 of the first embodiment in the other respects. The rotor 2c is applicable to the electric motor 1 according to the first embodiment, instead of the rotor 2.

The shaft 23a includes at least one recess 231 that is combined with the first resin part 24. In the example illustrated in FIGS. 7A and 7B, two recesses 231 are formed on an outer circumferential surface of the shaft 23a. Since the recesses 231 and the first resin part 24 are combined together, displacement of the first resin part 24 and the rotor core 21 with respect to the shaft 23a in the axial direction and in the circumferential direction can be prevented.

Fourth Variation

Figure 8A:
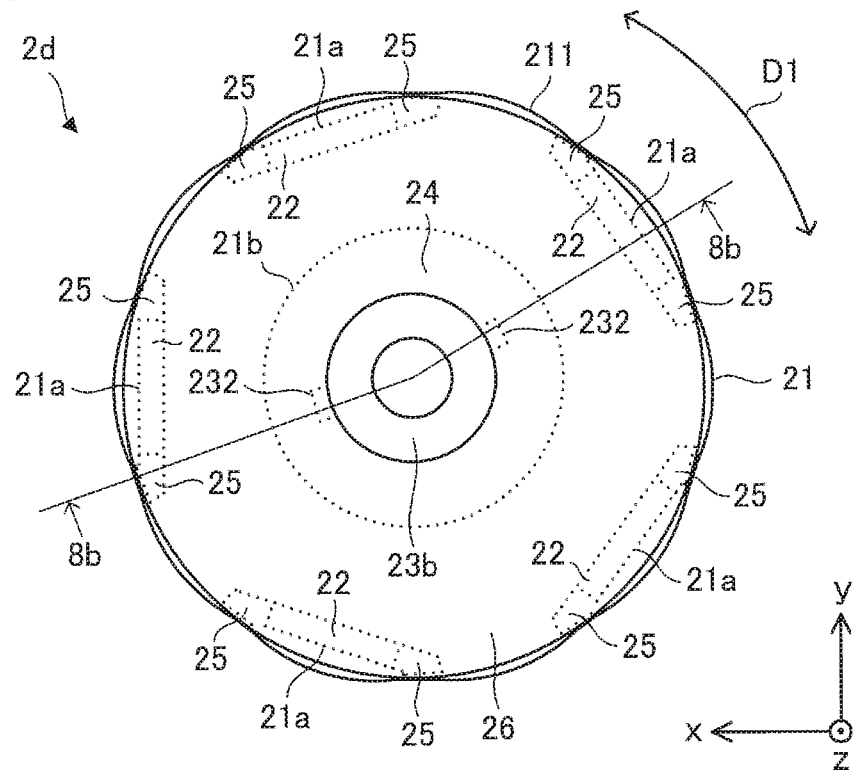
FIG. 8A is a plan view schematically illustrating a structure of a rotor of an electric motor according to a fourth variation.
Figure 8B:
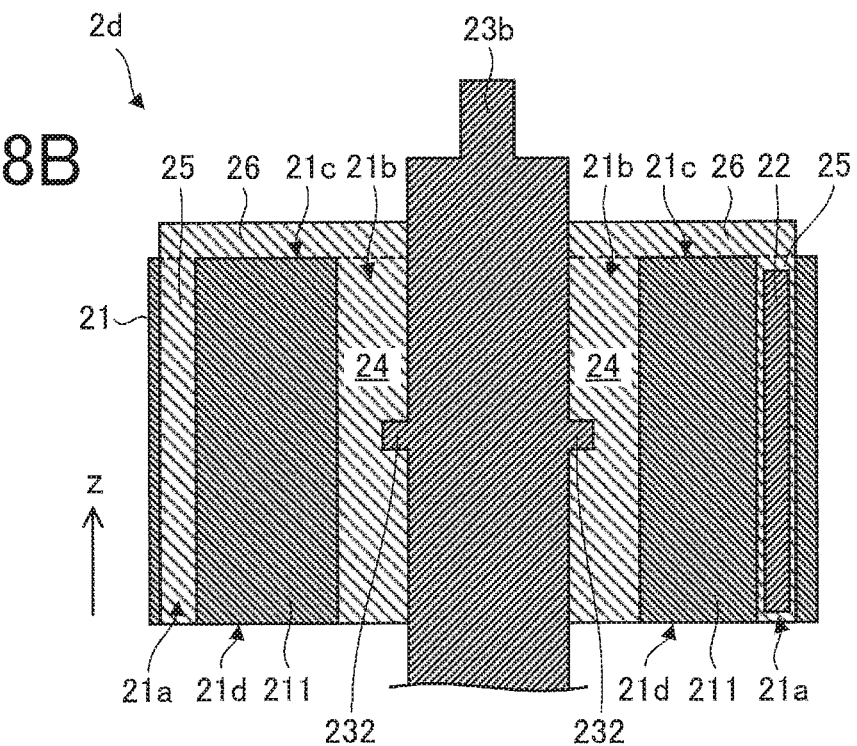
FIG. 8B is a cross-sectional view of the rotor taken along line 8b-8b in FIG. 8A.

FIG. 8A is a plan view schematically illustrating a structure of a rotor 2d of an electric motor according to a fourth variation. FIG. 8B is a cross-sectional view of the rotor 2d taken along line 8b-8b in FIG. 8A.

The rotor 2d of the electric motor according to the fourth variation includes a shaft 23b. The rotor 2d is different from the rotor 2 of the electric motor 1 according to the first embodiment in including the shaft 23b instead of the shaft 23, and is the same as the rotor 2 of the first embodiment in the other points. The rotor 2d is applicable to the electric motor 1 according to the first embodiment, instead of the rotor 2.

The shaft 23b includes at least one protrusion 232 projecting into the first resin part 24. In the example illustrated in FIGS. 8A and 8B, two protrusions 232 are formed on an outer circumferential surface of the shaft 23b. Since the protrusions 232 protrude into the first resin part 24, displacement of the first resin part 24 and the rotor core 21 from the shaft 23b in the axial direction and in the circumferential direction can be prevented.

Fifth Variation

Figure 9A:
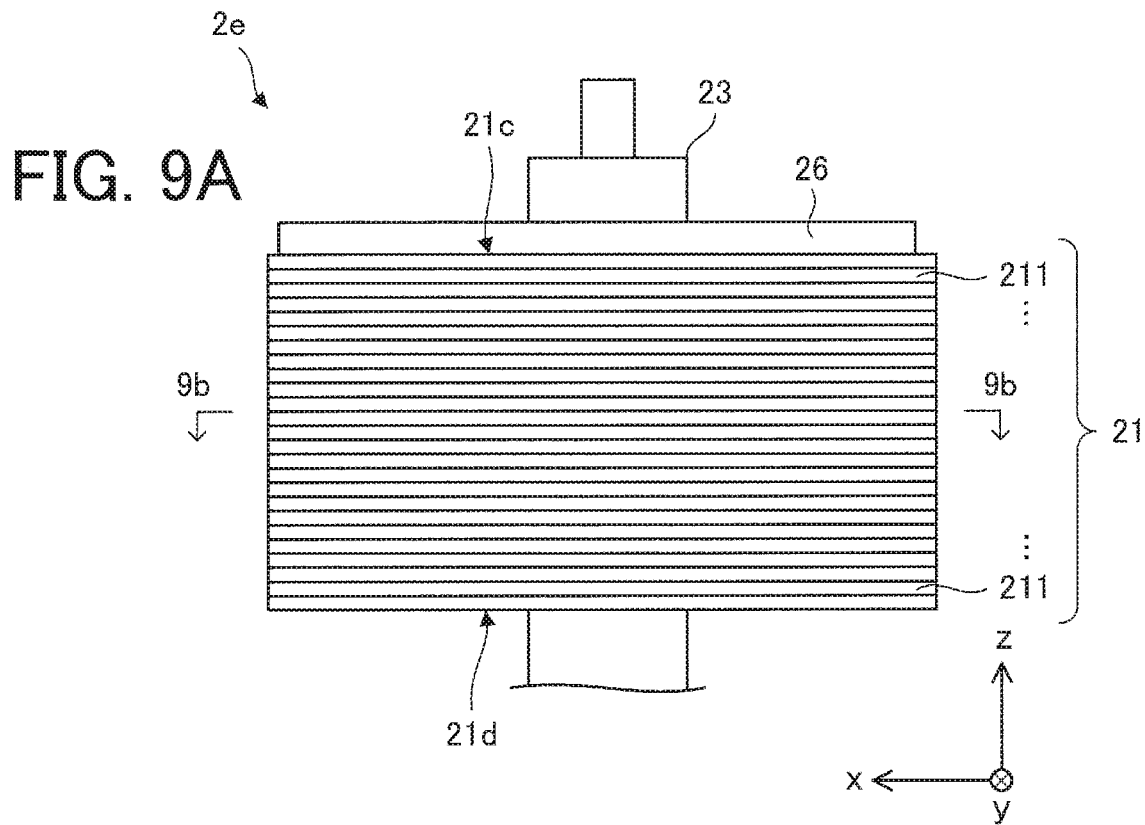
FIG. 9A is a front view schematically illustrating a structure of a rotor of an electric motor according to a fifth variation.
Figure 9B:
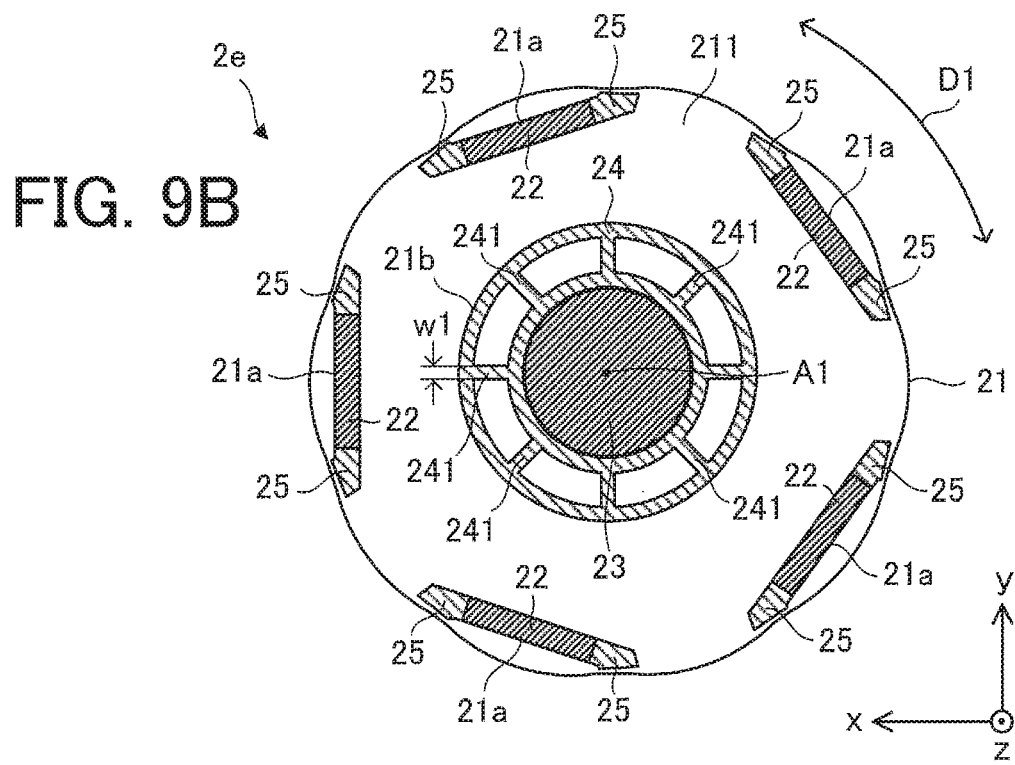
FIG. 9B is a cross-sectional view of the rotor taken along line 9b-9b in FIG. 9A.

FIG. 9A is a front view schematically illustrating a structure of a rotor 2e of an electric motor according to a fifth variation. FIG. 9B is a cross-sectional view of the rotor 2e taken along line 9b-9b in FIG. 9A.

A first resin part 24 of the electric motor according to the fifth variation includes a plurality of ribs 241 extending in the radial direction. The rotor 2e is different from the rotor 2 of the electric motor 1 according to the first embodiment in that the first resin part 24 includes the ribs 241, and is the same as the rotor 2 of the first embodiment in the other respects. The rotor 2e is applicable to the electric motor 1 according to the first embodiment, instead of the rotor 2.

In the example illustrated in FIG. 9B, the first resin part 24 includes eight ribs 241. The ribs 241 are formed radially about the axis line A1. The ribs 241 are arranged at regular intervals in the circumferential direction. It is desirable that a width w1 of each rib 241 be uniform in the radial direction. The ribs 241 may have different sizes and shapes. For example, the lengths of the ribs 241 in the radial direction and the axial direction may be arbitrary lengths.

Sixth Variation

Figure 10A:
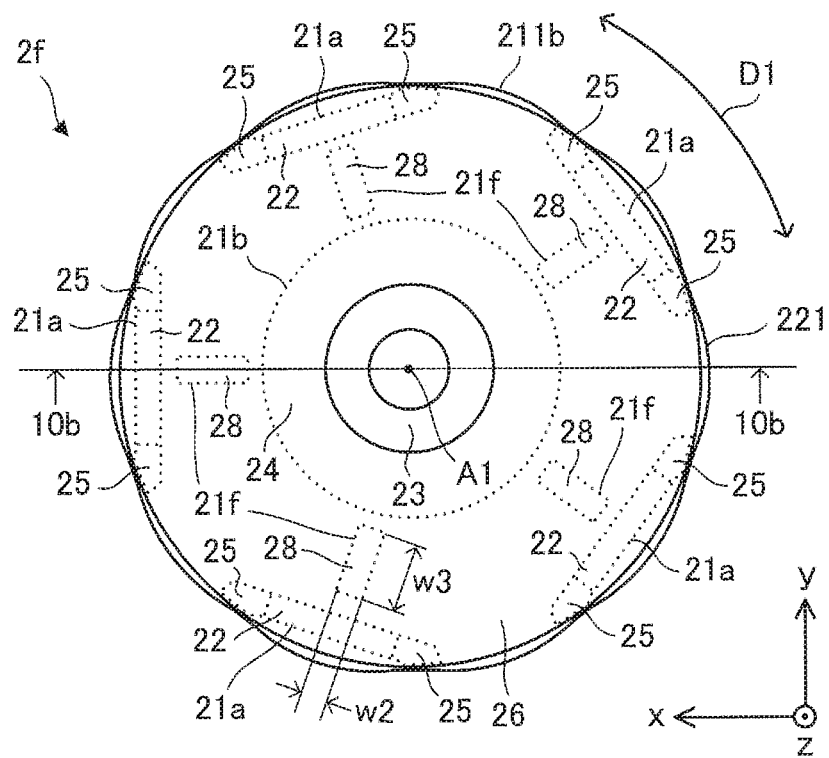
FIG. 10A is a plan view schematically illustrating a structure of a rotor of an electric motor according to a sixth variation.
Figure 10B:
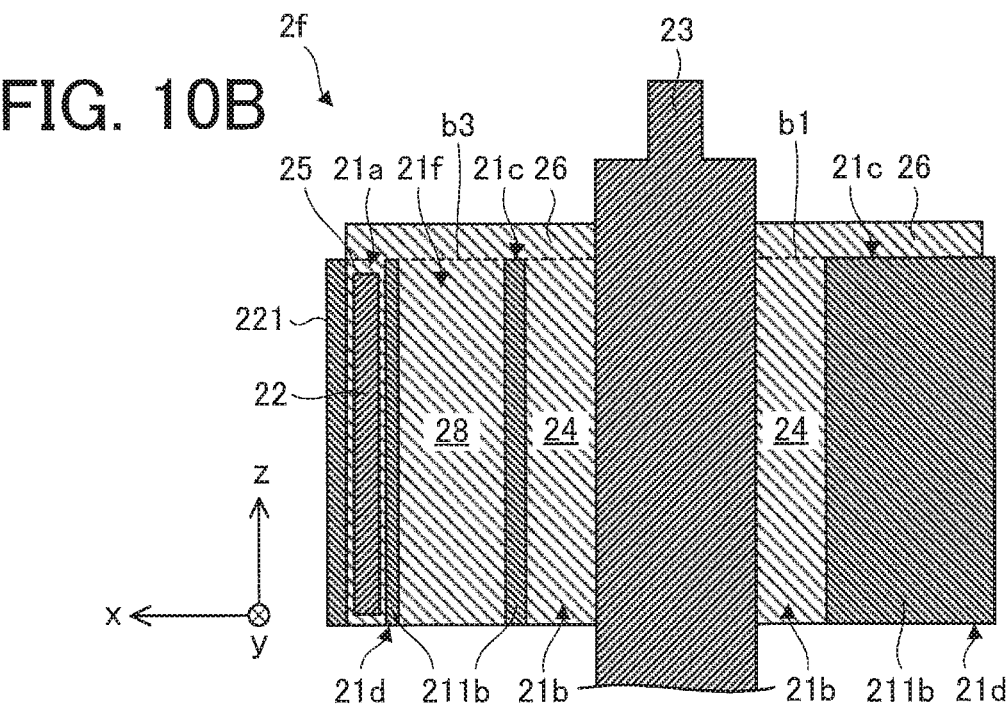
FIG. 10B is a cross-sectional view of the rotor taken along line 10b-10b in FIG. 10A.

FIG. 10A is a plan view schematically illustrating a structure of a rotor 2f of an electric motor according to a sixth variation, and FIG. 10B is a cross-sectional view of the rotor 2f taken along line 10b-10b in FIG. 10A.

The rotor 2f of the electric motor according to the sixth variation includes a fifth resin part 28 as a fifth part. The rotor 2f includes a rotor core 221 (specifically, electromagnetic steel sheets 211b) includes at least one slit 21f. The electric motor according to the sixth variation is the same as the electric motor 1 according to the first embodiment in the other respects. The rotor 2f is applicable to the electric motor 1 according to the first embodiment, instead of the rotor 2. In the sixth variation, the first part, the second part, the third part, and the fifth part are resin bodies made of a resin material (including plastics), but may be structures made of a material except the resin material (a material containing non-magnetic material as a main component).

The fifth resin part 28 is formed in the slit 21f, and is formed integrally with the third resin part 26. In the example illustrated in FIGS. 10A and 10B, the rotor core 221 includes five slits 21f. The slits 21f are formed radially about the axis line A1. The slits 21f are arranged at regular intervals in the circumferential direction. A width w2 of each slits 21f is uniform in the radial direction. It is desirable that a length w3 of each slits 21f in the radial direction be greater than or equal to the thickness of each electromagnetic steel sheet 211b in order to maintain strength of each electromagnetic steel sheet 211b. In addition, it is desirable that the width w2 and the length w3 of each slit 21f be set in consideration of the thickness of the third resin part 26 in the axial direction and a magnetic path of magnetic flux from the permanent magnets 22. For example, to increase the thickness of the third resin part 26 in the axial direction as much as possible, it is desirable that the width w2 and the length w3 of each slit 21f be as large as possible. The slits 21f may be have different sizes and shapes. For example, the lengths of the slits 21f in the radial direction and the axial direction may be arbitrary lengths. The rotor core 221 may include an electromagnetic steel sheet in which no slit 21f formed.

The width w2 of each slit 21f may be formed to become narrower from an inner side toward an outer side in the radial direction. Accordingly, a magnetic path through which magnetic flux from the permanent magnets 22 pass can be appropriately formed, and thus, a decrease in magnetic force of the rotor 2f can be suppressed.

A broken line b1 in FIG. 10B represents a boundary between a region where the third resin part 26 is formed and a region where the first resin part 24 is formed. A broken line b3 in FIG. 10B represents a boundary between the region where the third resin part 26 is formed and a region where the first resin part 24, the second resin part 25, and the fifth resin part 28 are formed.

The first resin part 24, the second resin part 25, the third resin part 26, and the fifth resin part 28 are integrally made of the same resin material. That is, the first resin part 24, the second resin part 25, the third resin part 26, and the fifth resin part 28 are a single structure (resin body) molded by integral molding. Thus, in this embodiment, the first resin part 24, the second resin part 25, the third resin part 26, and the fifth resin part 28 are not separated from one another in structure. The first resin part 24, the second resin part 25, the third resin part 26, and the fifth resin part 28 are a resin containing a non-magnetic material (non-magnetic resin) as a main component.

Seventh Variation

Figure 11A:
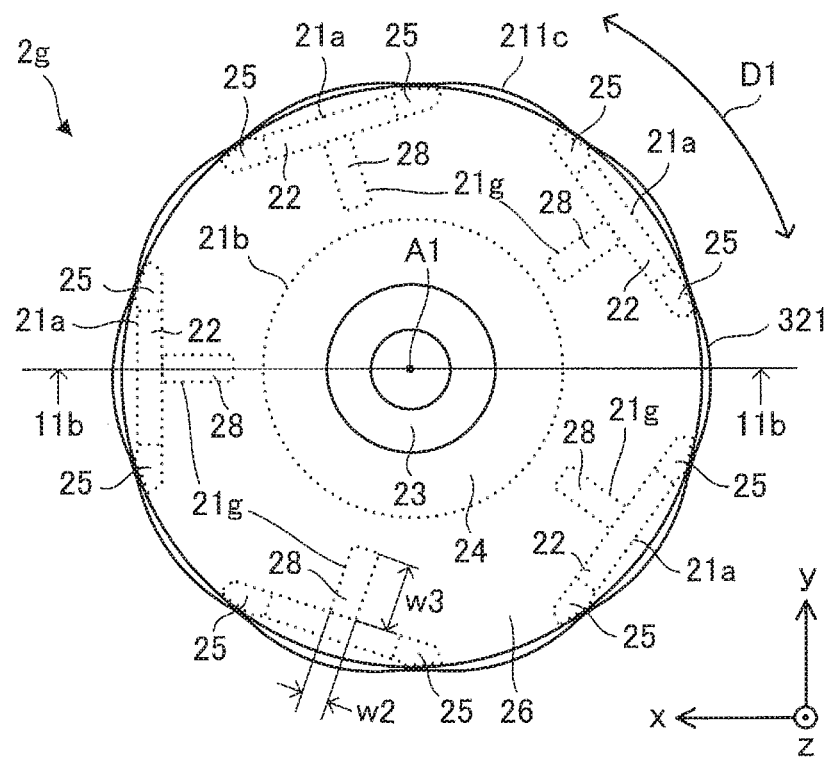
FIG. 11A is a plan view schematically illustrating a structure of a rotor of an electric motor according to a seventh variation.
Figure 11B:
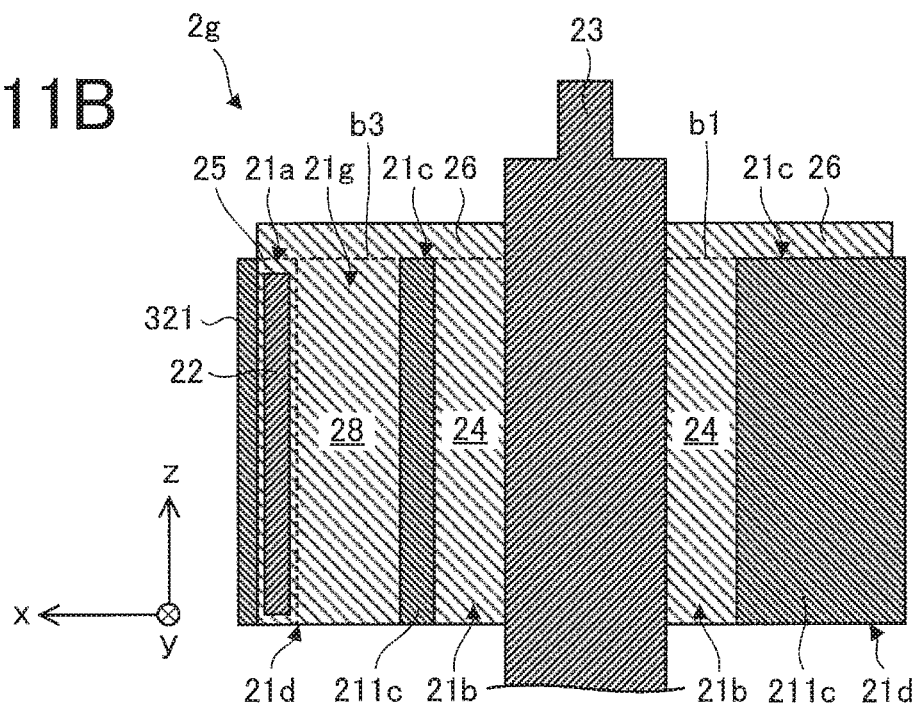
FIG. 11B is a cross-sectional view of the rotor taken along line 11b-11b in FIG. 11A.

FIG. 11A is a plan view schematically illustrating a structure of a rotor 2g of an electric motor according to a seventh variation. FIG. 11B is a cross-sectional view of the rotor 2g taken along line 11b-11b in FIG. 11A.

The rotor 2g of the electric motor according to the seventh variation includes a fifth resin part 28. The rotor core 321 (specifically, electromagnetic steel sheets 211c) of the rotor 2g includes at least one slit 21g. The electric motor according to the seventh variation is the same as the electric motor 1 according to the first embodiment in the other respects. The rotor 2g is applicable to the electric motor 1 according to the first embodiment, instead of the rotor 2.

At least one slit 21g of a plurality of slit 21g communicates with a magnet insertion hole 21a in the radial direction. The fifth resin part 28 formed in the slit 21g communicating with the magnet insertion hole 21a and the second resin part 25 are made of the same resin material integrally. In the example illustrated in FIGS. 11A and 11B, each slit 21g communicates with the magnet insertion hole 21a in the radial direction. Thus, the fifth resin part 28 formed in the slit 21g and the second resin part 25 are made of the same resin material integrally. Thus, the second resin part 25 and the fifth resin part 28 are not separated from one another in structure. The rotor 2g illustrated in FIGS. 11A and 11B are the same as the rotor 2f (sixth variation) illustrated in FIGS. 10A and 10B in the other respects.

Eighth Variation

Figure 12A:
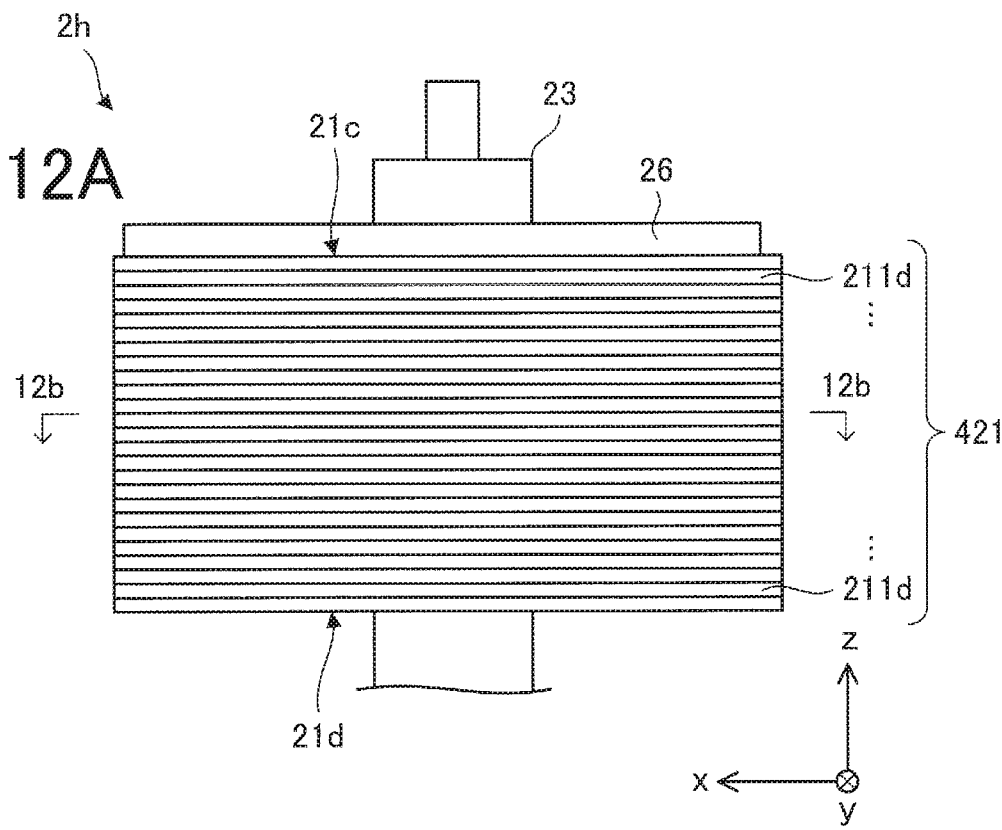
FIG. 12A is a front view schematically illustrating a structure of a rotor.
Figure 12B:
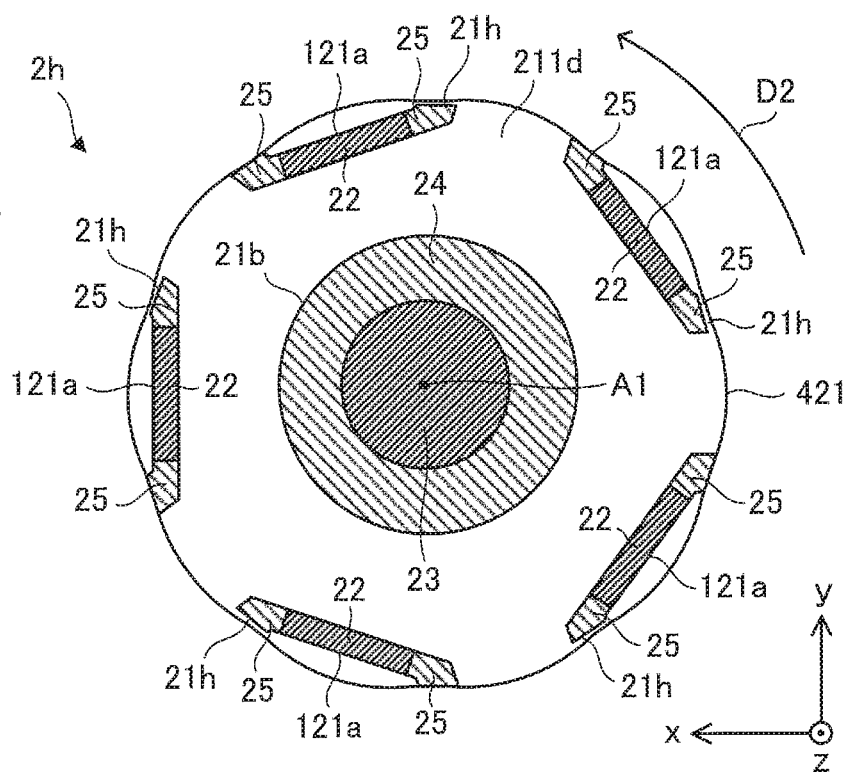
FIG. 12B is a cross-sectional view of the rotor taken along line 12b-12b in FIG. 12A.

FIG. 12A is a front view schematically illustrating a structure of a rotor 2h. FIG. 12B is a cross-sectional view of the rotor 2h taken along line 12b-12b in FIG. 12A. Arrow D2 represents a circumferential direction of the rotor core 421 and the rotor 2h (hereinafter simply referred to as a "circumferential direction"). Arrow D2 also represents rotation directions of the rotor core 421 and the rotor 2h.

Figure 13A:
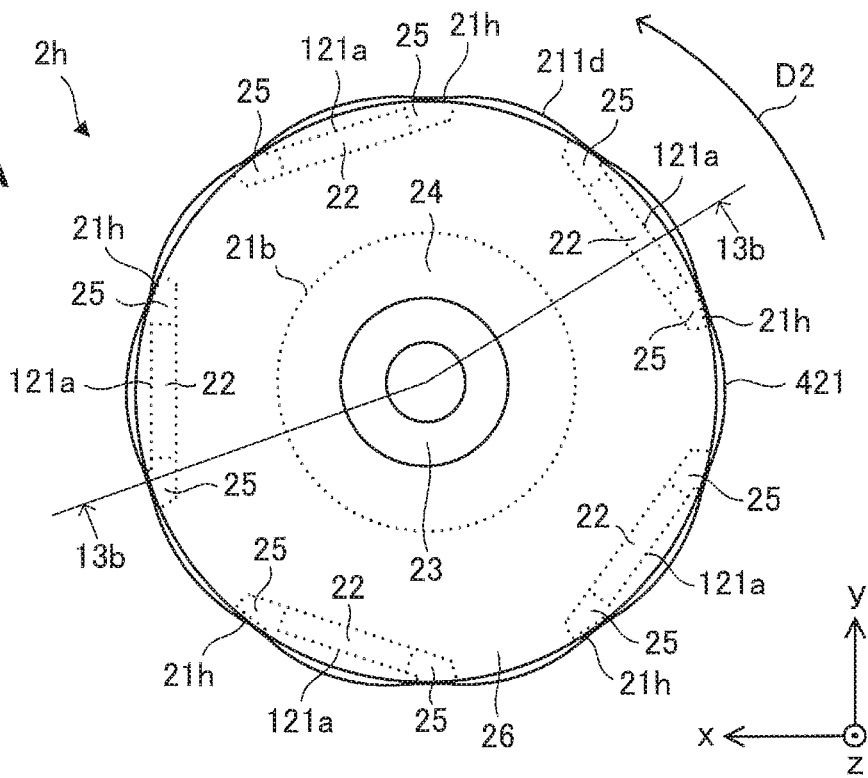
FIG. 13A is a plan view schematically illustrating the structure of the rotor.
Figure 13B:
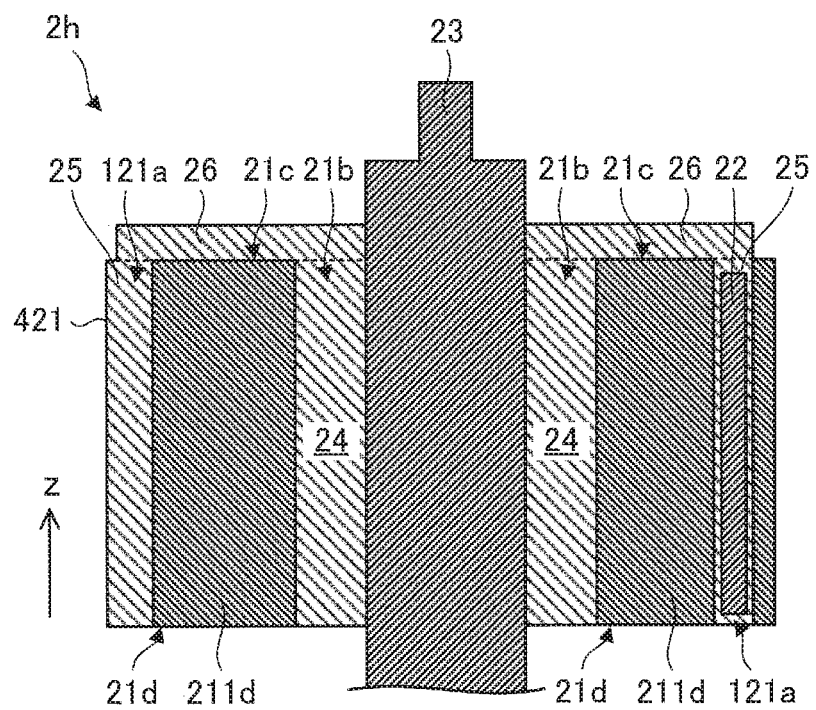
FIG. 13B is a cross-sectional view of the rotor taken along line 13b-13b in FIG. 13A.

FIG. 13A is a plan view schematically illustrating the structure of the rotor 2h. FIG. 13B is a cross-sectional view of the rotor 2h taken along line 13b-13b in FIG. 13A.

A portion of each magnet insertion hole 121a of the rotor 2h of an electric motor according to an eighth variation communicates with the outside of the rotor core 421 in the radial direction. In this respect, the rotor 2h is different from the rotor 2 of the electric motor 1 according to the first embodiment, and is the same as the rotor 2 in the other respects. The rotor 2h is applicable to the electric motor 1 according to the first embodiment, instead of the rotor 2.

A portion of the magnet insertion hole 121a communicates with the outside of the rotor core 421 in the radial direction, and a second resin part 25 is formed inside the magnet insertion hole 121a. Thus, a portion of the second resin part 25 is exposed to the outside of the rotor core 421 in the radial direction (the outside in the radial direction).

The rotor core 421 (specifically, electromagnetic steel sheets 211d) includes a plurality of bridges 21h. Each of the bridges 21h is a portion of the electromagnetic steel sheets 211d extending between the outer circumferential surface of the rotor core 421 and the magnet insertion holes 121a. Each of the bridges 21h is formed at a position facing one end of the magnet insertion hole 121a in a longitudinal direction. In the example illustrated in FIG. 12B, for each one of the magnet insertion holes 121a, the bridge 21h is formed at an upstream side in the rotation direction of the rotor 2h. That is, in the example illustrated in FIGS. 12A and 12B, the bridge 21h is formed at the position facing one end of each magnet insertion hole 121a in the longitudinal direction, and no bridge 21h is not formed at the other end. The second resin part 25 exposed to the outside of the rotor core 421 serves as a bridge instead of the bridge 21h. For one magnet insertion hole 121a, the bridge 21h may be formed at a downstream side in the rotation direction of the rotor 2h.

The bridge 21h and a portion where the second resin part 25 is formed instead of the bridge 21h have different specific gravities. Thus, asymmetry in the weight of the rotor 2h can cause noise during rotation of the rotor 2h. It is desired to form an area surrounding one magnetic insertion hole 121a so that the weight is symmetric in the longitudinal direction of the magnet insertion hole 121a. For example, electromagnetic steel sheets 211d in each of which the bridge 21h is formed on an upstream side in the rotation direction of the rotor 2h and electromagnetic steel sheets 211d in each of which the bridge 21h is formed on a downstream side in the rotation direction of the rotor 2h may be alternately stacked in the axial direction. Accordingly, asymmetry in weight in the longitudinal direction around the magnet insertion hole 121a of the rotor 2h (rotor core 421) can be reduced.

An example method for manufacturing the electric motor 1 will be described below. The method for manufacturing the electric motor 1 includes a method (steps S5 and S6) for manufacturing the rotor 2 (e.g., a consequent-pole type rotor).

Figure 14:
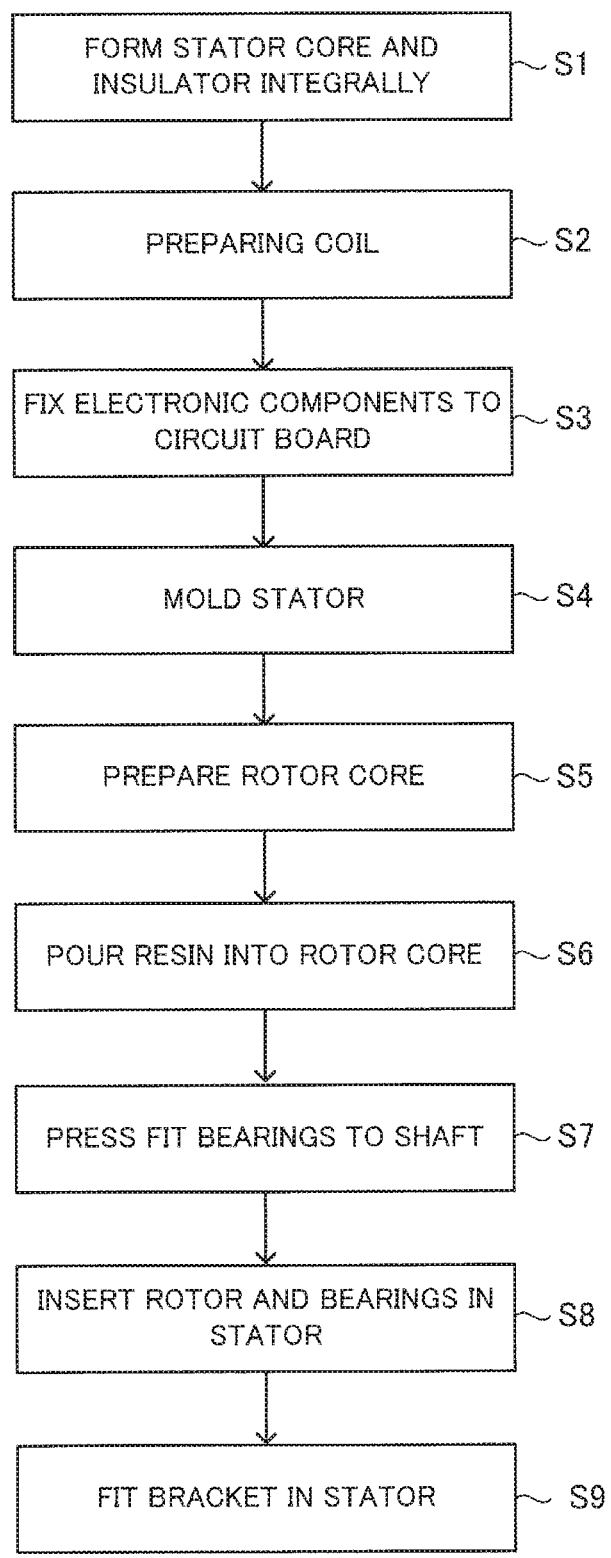
FIG. 14 is a flowchart showing an example of a method for manufacturing an electric motor.

FIG. 14 is a flowchart showing an example method for manufacturing the electric motor 1.

In step S1, a stator core 31 and an insulator 33 are formed integrally. The stator core 31 is formed by stacking a plurality of electromagnetic steel sheets.

In step S2, a lead wire is wound around the integrally formed stator core 31 and insulator 33 so that a coil 32 is prepared.

In step S3, electronic components such as a control circuit and a magnetic sensor 5 are fixed to a circuit board 4.

In step S4, a space surrounding the circuit board 4 to which the electronic components are fixed and the stator core 31 is filled with a molding resin, and thus the stator 3 is molded.

In step S5, a rotor core 21 having magnet insertion holes 21a and a through hole 21b is prepared by stacking a plurality of electromagnetic steel sheets 211. For example, the rotor core 21 can be prepared by previously forming magnet insertion holes 21a and a through hole 21b in each electromagnetic steel sheet 211 and stacking a plurality of electromagnetic steel sheets 211 in which the magnet insertion holes 21a and the through hole 21b are formed. The electromagnetic steel sheets 211 (e.g., the magnet insertion holes 21a and the through hole 21b) can be shaped in any form by punching. For example, the projection 21e or the slit 21f may be formed in the electromagnetic steel sheet 211. Thereafter, permanent magnets 22 are inserted in the magnet insertion holes 21a, and magnetization is performed by applying magnetic field from the outside of the rotor core 21. The magnetization may be performed in another step (e.g., step S6). Subsequently, a shaft 23 is inserted in the through hole 21b. The plurality of electromagnetic steel sheets 211 are fixed together by, for example, swaging.

In step S6, a first resin part 24, a second resin part 25, and a third resin part 26 are formed by pouring a resin 40 containing a non-magnetic material (non-magnetic resin) as a main component into the rotor core 21.

Figure 15A:
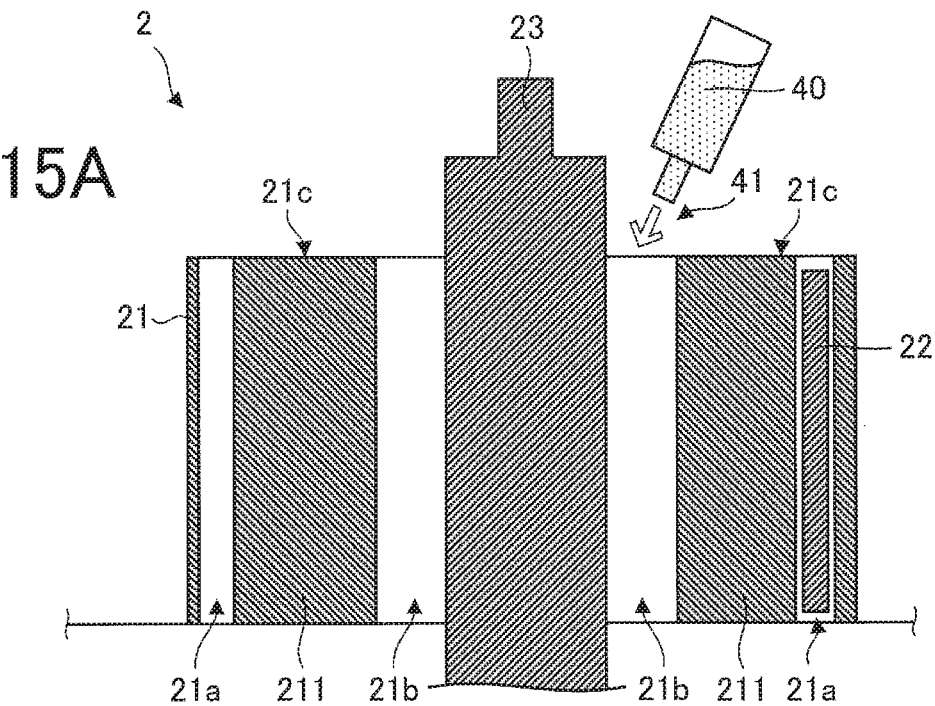
FIGS. 15A and 15B are diagrams illustrating process steps for forming a first resin part, a second resin part, and a third resin part.
Figure 15B:
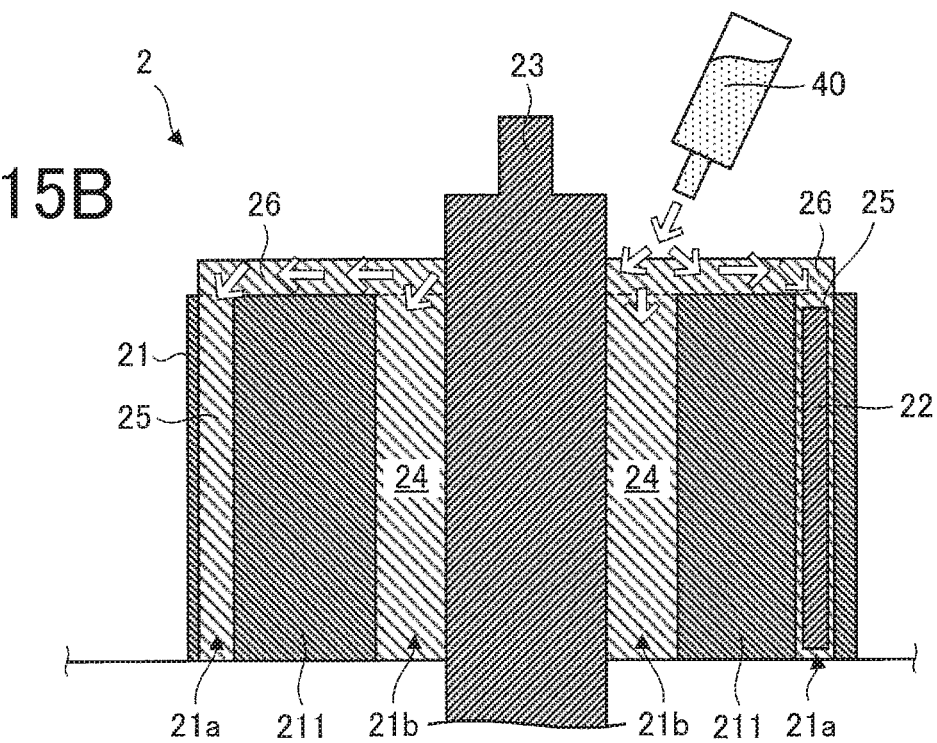

FIGS. 15A and 15B are diagrams showing steps of forming the first resin part 24, the second resin part 25, and the third resin part 26 in step S6.

As illustrated in FIG. 15A, the resin 40 is poured from one end side of the rotor core 21 in the axial direction toward an end of the rotor core 21 in the axial direction (e.g., the first end part 21c). In the example illustrated in FIGS. 15A and 15B, the resin 40 is poured into the through hole 21b from a resin injection port 41. In pouring the resin 40, the resin 40 is desirable to be strongly injected from one end side of the rotor core 21 in the axial direction so as to push the rotor core 21 (e.g., the first end part 21c) in the axial direction. Accordingly, occurrence of a gap between the electromagnetic steel sheets 211 can be suppressed.

The resin injection port 41 is set on a die formed to cover the rotor core 21, for example. The resin injection port 41 is set on one end side of the rotor core 21 in the axial direction. In the example illustrated in FIGS. 15A and 15B, the resin injection port 41 is disposed at a position facing the through hole 21b (e.g., above the through hole 21b). By filling the through hole 21b with the resin 40, the first resin part 24 is first formed in the through hole 21b.

As illustrated in FIG. 15B, the resin 40 is further injected from the resin injection port 41, the resin 40 gradually overflows the through hole 21b, and the third resin part 26 is formed on the first end part 21c of the rotor core 21, and at the same time, the magnet insertion holes 21a are filled with the resin 40. Accordingly, an area surrounding the permanent magnet 22 in the magnet insertion hole 21a is filled with the resin 40, and thus the second resin part 25 is formed.

By further injecting the resin 40 from the resin injection port 41, the third resin part 26 is also formed over the first end part 21c and the magnet insertion holes 21a. Accordingly, the first resin part 24, the second resin part 25, and the third resin part 26 are made of the same resin material (the resin 40) integrally. In this embodiment, the first part, the second part, and the third part are made of the same resin material, but may be made of a material except the resin material (a material containing a non-magnetic material as a main component).

In a case where a die covering the rotor core 21 is made so as to form a fourth resin part 27, the fourth resin part 27 illustrated in FIG. 6B can be formed by the method described above. In this case, the fourth resin part 27 is first formed among the first resin part 24, the second resin part 25, the third resin part 26, and the fourth resin part 27. In addition, by injecting the resin 40 from the resin injection port 41, the through hole 21b is filled with the resin 40, and thus the first resin part 24 is formed. As described above, by further injecting the resin 40 from the resin injection port 41, the second resin part 25 and the third resin part 26 are formed. Accordingly, the first resin part 24, the second resin part 25, the third resin part 26, and the fourth resin part 27 are made of the same resin material (the resin 40) integrally. In this case, the first part, the second part, the third part, and the fourth part are made of the same resin material, but may be made of a material except the resin material (a material containing a non-magnetic material as a main component).

Through the foregoing method, the rotor 2 described in the first embodiment (including the variations thereof) can be made.

In step S7, the bearings 7a and 7b are press fitted to the shaft 23.

The order of step S1 to step S7 is not limited to the order shown in the FIG. 14. For example, the assembly step of the stator 3 from step S1 to step S4 and the assembly step from step S5 to step S6 can be performed in parallel. The assembly step of the rotor 2 from step S5 to step S6 may be performed prior to the assembly step of the stator 3 from step S1 to step S4.

In step S8, the rotor 2 is inserted together with the bearings 7a and 7b in the stator 3 prepared in step S1 to step S4.

In step S9, the bracket 6 is fitted in the stator 3 in which the rotor 2 has been inserted.

Through the foregoing steps, the electric motor 1 can be manufactured.

According to the first embodiment, since the third resin part 26 is formed on the first end part 21c of the rotor core 21, it is possible to suppress a flow of magnetic flux from the permanent magnet 22 into the shaft 23 (occurrence of leakage flux). In a case where the first resin part 24 and the third resin part 26 contain a non-magnetic material as a main component, the shaft 23 is magnetically insulated from the first end part 21c of the rotor core 21 (specifically, the permanent magnet 22) by the first resin part 24 and the third resin part 26. Thus, occurrence of leakage flux can be further suppressed.

The rotor core 21 is longer than the permanent magnet 22 in the axial direction. Specifically, the length L1 of the rotor core 21 in the axial direction is longer than the length L2 of the permanent magnet 22 in the axial direction. In other words, the length of the magnet insertion hole 21a is larger than the length L2 of the permanent magnet 22 in the axial direction. Accordingly, the second resin part 25 comes into a portion of the magnet insertion holes 21a near the first end part 21c, and thus the second resin part 25 formed near the first end part 21c can be increased. Accordingly, integral formation of the second resin part 25 and the third resin part 26 can be easily performed. In addition, in a case where the second resin part 25 contains a non-magnetic material as a main component, the shaft 23 is magnetically insulated from the permanent magnet 22 by the second resin part 25. Thus, occurrence of leakage flux can be further reduced.

In a case where the second resin part 25 touches all outer surfaces of a plurality of outer surfaces of the permanent magnet 22, the permanent magnet 22 is fixed in all directions by the second resin part 25. Accordingly, vibrations of the permanent magnet 22 during rotation of the rotor 2 can be reduced. As a result, noise of the electric motor 1 can be reduced. In a case where the rotor 2 is formed such that the entire permanent magnet 22 (the entire circumference) is covered with the second resin part 25, vibrations of the permanent magnet 22 can be further reduced, and thus, noise of the electric motor 1 can be further reduced.

Since the permanent magnet 22 is covered with the second resin part 25 in the axial direction, the permanent magnet 22 can be fixed in the axial direction. Thus, no fixing member such as end plate is needed.

Since the third resin part 26 is formed integrally with the first resin part 24 and the second resin part 25, strength of the rotor 2 can be enhanced. Specifically, the total strength of the first resin part 24, the second resin part 25, and the third resin part 26, especially strength of boundary portions between the first and second resin parts 24 and 25 and the third resin part 26, can be increased. In addition, since the length L1 of the rotor core 21 in the axial direction (specifically, the length of the magnet insertion holes 21a in the axial direction) is larger than the length L2 of the permanent magnet 22 in the axial direction, the second resin part 25 can be formed in an end portion of the magnet insertion hole 21a in the axial direction. In particular, strength of a boundary portion between the second resin part 25 and the third resin part 26 can be increased.

Furthermore, according to the first embodiment, by pouring a resin from one end side of the rotor core 21 in the axial direction toward an end of the rotor core 21 in the axial direction (e.g., the first end part 21c), for example, the first resin part 24, the second resin part 25, and the third resin part 26 can be made of the same resin material integrally. Accordingly, the first resin part 24, the second resin part 25, and the third resin part 26 do not need to be formed integrally beforehand. Since the step of attaching the first resin part 24, second resin part 25, and third resin part 26 that are previously formed integrally to the rotor core 21 is unnecessary, the number of manufacturing processes can be reduced, and the rotor 2 and the electric motor 1 can be manufactured easily.

According to the first variation, since the permanent magnet 22 is fixed in the circumferential direction by the projection 21e, displacement of the permanent magnet 22 during rotation of the rotor 2a can be prevented. In addition, since the projection 21e is formed only in the electromagnetic steel sheet 211a of the plurality of electromagnetic steel sheets, the resin material can be easily poured in the magnet insertion hole 21a, and thus, the larger second resin part 25 can be formed. Accordingly, displacement of the permanent magnet 22 can be effectively prevented.

According to the second variation, the rotor core 21 is sandwiched between the third resin part 26 and the fourth resin part 27 in the axial direction. Thus, displacement of the rotor core 21 from the shaft 23 in the axial direction can be prevented.

According to the third variation, displacement of the first resin part 24 and the rotor core 21 in the axial direction and in the circumferential direction from the shaft 23a can be prevented.

According to the fourth variation, displacement of the first resin part 24 and the rotor core 21 in the axial direction and in the circumferential direction from the shaft 23b can be prevented.

According to the fifth variation, inertia and natural frequency of the rotor 2e can be adjusted by adjusting the shape of the rib 241. Thus, vibrations and noise caused by rotation of the rotor 2e can be adjusted.

According to the sixth variation, the total strength of the first resin part 24, the second resin part 25, and the third resin part 26, especially strength of a boundary portion between the first and second resin parts 24 and 25 and the third resin part 26, can be increased. In addition, the third resin part 26 can be formed to be thick in the axial direction.

According to the seventh variation, the permanent magnet 22 can be fixed in a state where the permanent magnet 22 pressed outward in the radial direction by the fifth resin part 28 formed in the slit 21g. Accordingly, displacement of the permanent magnet 22 in the magnet insertion hole 21a can be prevented, and thus symmetry of the rotor 2g in structure can be enhanced.

According to the eighth variation, formation of the bridges 21h can increase rigidity of the rotor core 421 (especially the magnet insertion holes 121a). Because the bridge 21h is formed, part of magnetic flux from the permanent magnet 22 may pass through the bridge 21h, and this may cause leakage flux. However, the second resin part 25 is formed in a portion where no bridge 21h is formed, and thus rigidity of the rotor core 421 (especially around the magnet insertion holes 121a) can be increased, and furthermore, leakage flux can be reduced. In particular, when the rotor 2h is applied to an electric motor in which leakage flux to bridges occupies 4% or more of magnetic flux in the entire rotor, leakage flux can be effectively suppressed.

With the method for manufacturing the electric motor 1 and the rotor 2 according to the first embodiment, the electric motor 1 and the rotor 2 having the foregoing advantages can be manufactured.

In addition, with the method for manufacturing the electric motor 1 and the rotor 2 according to the first embodiment, by pouring the resin 40 from one end side of the rotor core 21 in the axial direction toward an end of the rotor core 21 in the axial direction (e.g., the first end part 21c), for example, the first resin part 24, the second resin part 25, and the third resin part 26 can be made of the same resin material (the resin 40) integrally. Accordingly, the first resin part 24, the second resin part 25, and the third resin part 26 do not need to be formed integrally beforehand. In other words, the step of forming the first resin part 24, the second resin part 25, and the third resin part 26 integrally and the step of attaching the first resin part 24, the second resin part 25, and the third resin part 26 to the rotor core 21 can be performed at the same time. Thus, the step of attaching the first resin part 24, the second resin part 25, and the third resin part 26 that are previously formed integrally to the rotor core 21 is unnecessary, the number of manufacturing processes can be reduced, and the rotor 2 can be manufactured easily.

In addition, with the method for manufacturing the electric motor 1 and the rotor 2 according to the first embodiment, since the resin 40 is poured from the position facing the through hole 21b (e.g., above the through hole 21b), the through hole 21b is filled with the resin from the inner side toward the outer side in the radial direction. Accordingly, the first resin part 24, the second resin part 25, and the third resin part 26 (especially, the third resin part 26) can be uniformly formed about the axis line A1. As a result, asymmetry in structure about the axis line A1 can be reduced. In the manner described above, the electric motor 1 and the rotor 2 that can reduce noise caused by displacement of a rotation barycenter of the rotor 2 can be manufactured.

In general, when warped electromagnetic steel sheets are stacked, a gap is formed between the electromagnetic steel sheets. The gap between the electromagnetic steel sheets hinders formation of magnetic flux, thereby causing a decrease in magnetic force of a rotor. In view of this, with the method for manufacturing the electric motor 1 and the rotor 2 according to the first embodiment, in pouring the resin 40, the resin 40 is strongly injected from one end side of the rotor core 21 in the axial direction so as to push the rotor core 21 (e.g., the first end part 21c) in the axial direction. Accordingly, the rotor core 21 is pushed in the axial direction by the injection of the resin 40, and thus formation of a gap between the electromagnetic steel sheets 211 can be reduced and, at the same time, the rotor core 21 can be filled with the resin 40.

In addition, the length L1 of the rotor core 21 in the axial direction (specifically, the length of the magnet insertion hole 21a in the axial direction) is larger than the length L2 of the permanent magnet 22 in the axial direction so that the resin 40 can be easily poured into the magnet insertion hole 21a.

Second Embodiment

An air conditioner 10 according to a second embodiment of the present invention will be described.

FIG. 16 is a diagram schematically illustrating a configuration of the air conditioner 10 according to the second embodiment of the present invention.

FIG. 17 is a diagram schematically illustrating main components in an outdoor unit 13 of the air conditioner 10.

The air conditioner 10 according to the second embodiment includes an indoor unit 11, a refrigerant pipe 12 and the outdoor unit 13 connected to the indoor unit 11 by the refrigerant pipe 12.

The indoor unit 11 includes an electric motor 11a and an air blower lib (an air blower for the indoor unit). The outdoor unit 13 includes an electric motor 13a, a fan 13b as an air blower (an air blower for the outdoor unit), a compressor 13c, and a heat exchanger (not shown). The compressor 13c includes an electric motor 13d (e.g., the electric motor 1 according to the first embodiment), a compression mechanism 13e (e.g., a refrigerant circuit) that is driven by the electric motor 13d, a housing 13f housing the electric motor 13d and the compression mechanism 13e.

In the air conditioner 10 according to the second embodiment, at least one of the indoor unit 11 and the outdoor unit 13 includes the electric motor 1 described in the first embodiment (including the variations). Specifically, as a driving source of the air blower, the electric motor 1 described in the first embodiment (including the variations) is applied to at least one of the electric motors 11a and 13a. In addition, the electric motor 1 described in the first embodiment (including the variations) may be used as the electric motor 13d of the compressor 13c.

The air conditioner 10 can, for example, perform operations such as a cooling operation of sending cold air from the indoor unit 11 or a heating operation of sending hot air. In the indoor unit 11, the electric motor 11a is a driving source for driving the air blower 11b. The air blower 11b can send conditioned air.

As illustrated in FIG. 17, in the outdoor unit 13, the electric motor 13a is a driving source for driving the fan 13b. The electric motor 13a is fixed to a casing of the outdoor unit 13 with screws, for example. A shaft of the electric motor 13a is coupled to the fan 13b. The fan 13b rotates by driving of the electric motor 13a.

In the air conditioner 10 according to the second embodiment, the electric motor 1 described in the first embodiment (including the variations) is applied to at least one of the electric motors 11a and 13a, and thus, advantages similar to those described in the first embodiment can be obtained.

In addition, according to the second embodiment, the compressor 13c that operates at high efficiency and low noise and the air conditioner 10 that operates at high efficiency and low noise can be provided.

The electric motor 1 described in the first embodiment (including the variations thereof) can be mounted on equipment including a driving source, such as a ventilator, a home appliance, or a machine tool, in addition to the air conditioner 10.

Features of the embodiments and features of the variations described above can be combined as appropriate.

What is claimed is:

1. A consequent-pole type rotor used for an electric motor including a stator, comprising:
   a rotor core including a first end part and a second end part in an axial direction, and five magnet insertion holes;
   five permanent magnets disposed in the five permanent magnet insertion holes, respectively;
   a first part formed inside the rotor core in a radial direction;
   a second part that is adjacent to the respective permanent magnets in the respective magnet insertion holes; and
   a third part formed on the first end part, the third part being formed integrally with the first part and the second part; and
   a shaft formed inside the first part in the radial direction, wherein
   the shaft is fixed to the first part,
   the rotor core is longer than the five permanent magnets in the axial direction,
   a length of the first part in the radial direction is three times or more as large as a length of an air gap formed between the stator and the rotor core,
   a length of the rotor core in the radial direction is at maximum in a portion where each of the five permanent magnets is disposed and a portion constituting a pseudo- magnetic pole, and
   a length of the rotor core in the radial direction is at minimum in an inter-pole part.

2. The consequent-pole type rotor according to claim 1, wherein the permanent magnet has a plurality of outer surfaces, and
   wherein the second part is adjacent to the permanent magnet so as to touch all outer surfaces of the plurality of outer surfaces.

3. The consequent-pole type rotor according to claim 1, wherein the first part is a resin containing a non-magnetic material as a main component.

4. The consequent-pole type rotor according to claim 1, wherein the second part is a resin containing a non-magnetic material as a main component.

5. The consequent-pole type rotor according to claim 1, wherein the third part is a resin containing a non-magnetic material as a main component.

6. The consequent-pole type rotor according to claim 1, further comprising a fourth part formed on the second end part,
   wherein the fourth part is formed integrally with the first part.

7. The consequent-pole type rotor according to claim 6, wherein the fourth part is a resin containing a non-magnetic material as a main component.

8. The consequent-pole type rotor according to claim 1, wherein the rotor core includes a magnet fixing part to fix the permanent magnet.

9. The consequent-pole type rotor according to claim 1, wherein the shaft has a recess that is combined with the first part.

10. The consequent-pole type rotor according to claim 1, wherein the shaft has a protrusion protruding into the first part.

11. The consequent-pole type rotor according to claim 1, wherein the first part has a rib formed in the radial direction.

12. The consequent-pole type rotor according to claim 1, further comprising a fifth part,
wherein the rotor core has a slit, and
wherein the fifth part is formed in the slit and formed integrally with the third part.

13. The consequent-pole type rotor according to claim 12, wherein the slit communicates with the hole in which the permanent magnet is inserted.

14. The consequent-pole type rotor according to claim 13, wherein the fifth part is formed integrally with the second part.

15. The consequent-pole type rotor according to claim 1, wherein a portion of the hole in which the permanent magnet is inserted communicates with an outside of the rotor core in the radial direction.

16. The consequent-pole type rotor according to claim 15, wherein a portion of the second part is exposed outside the rotor core in the radial direction.

17. An electric motor comprising:
a stator; and
a consequent-pole type rotor,
wherein the consequent-pole type rotor includes
a rotor core including a first end part and a second end part in an axial direction, and five magnet insertion holes,
five permanent magnets disposed in the five permanent magnet insertion holes, respectively;
a first part formed inside the rotor core in a radial direction,
a second part that is adjacent to the respective permanent magnets in the respective magnet insertion holes, and
a third part formed on the first end part, the third part being formed integrally with the first part and the second part, and
a shaft formed inside the first part in the radial direction, wherein
the shaft is fixed to the first part,
the rotor core is longer than the five permanent magnets in the axial direction,
a length of the first part in the radial direction is three times or more as large as a length of an air gap formed between the stator and the rotor core,
a length of the rotor core in the radial direction is at maximum in a portion where each of the five permanent magnets is disposed and a portion constituting a pseudo- magnetic pole, and
a length of the rotor core in the radial direction is at minimum in an inter-pole part.

18. An air conditioner comprising:
an indoor unit; and
an outdoor unit connected to the indoor unit,
wherein at least one of the indoor unit and the outdoor unit includes an electric motor,
wherein the electric motor includes
a stator; and
a consequent-pole type rotor,
wherein the consequent-pole type rotor includes
a rotor core including a first end part and a second end part in an axial direction, and five magnet insertion holes,
five permanent magnets disposed in the five permanent magnet insertion holes, respectively;
a first part formed inside the rotor core in a radial direction,
a second part that is adjacent to the respective permanent magnets in the respective magnet insertion holes, and
a third part formed on the first end part, the third part being formed integrally with the first part and the second part, and
a shaft formed inside the first part in the radial direction, wherein
the shaft is fixed to the first part,
the rotor core is longer than the five permanent magnets in the axial direction,
a length of the first part in the radial direction is three times or more as large as a length of an air gap formed between the stator and the rotor core,
a length of the rotor core in the radial direction is at maximum in a portion where each of the five permanent magnets is disposed and a portion constituting a pseudo-magnetic pole, and
a length of the rotor core in the radial direction is at minimum in an inter-pole part.

19. A method for manufacturing a consequent-pole type rotor including a rotor core including five magnet insertion holes, five permanent magnets inserted in the five magnet insertion holes, respectively, a shaft, a first resin part formed inside the rotor core, a second resin part that is adjacent to the respective permanent magnets in the respective magnet insertion holes, and a third resin part formed on an end part of the rotor core in an axial direction of the rotor core, the consequent-pole type rotor being used for an electric motor including a statoi; the method comprising the steps of:
preparing the rotor core by stacking a plurality of electromagnetic steel sheets in which the five magnet insertion holes and a through hole are formed;
inserting the five permanent magnets into the five magnet insertion holes, respectively;
inserting the shaft into the through hole; and
forming the first resin part, the second resin part, and the third resin part integrally by pouring a resin toward an end of the rotor core in the axial direction,
wherein
the first resin part is formed so that a length of the first resin part in the radial direction is three times or more as large as a length of an air gap formed between the stator and the rotor core,
a length of the rotor core in the radial direction is at maximum in a portion where each of the five permanent magnets is disposed and a portion constituting a pseudo-magnetic pole,
a length of the rotor core in the radial direction is at minimum in an inter-pole part, and
the shaft is fixed to the first resin part.

* * * * *